April 18, 1933.  L. A. HAZELTINE  1,904,455
METHOD AND APPARATUS FOR CONVERTING ELECTRIC POWER
Filed July 5, 1923   15 Sheets-Sheet 1

LOUIS A. HAZELTINE
INVENTOR
BY
ATTORNEY

April 18, 1933.                L. A. HAZELTINE                1,904,455
METHOD AND APPARATUS FOR CONVERTING ELECTRIC POWER
Filed July 5, 1923           15 Sheets-Sheet 2
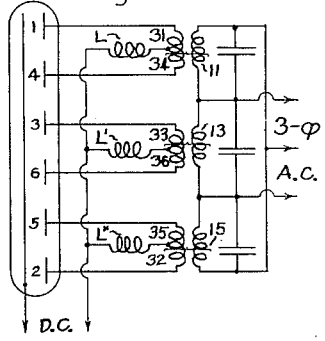
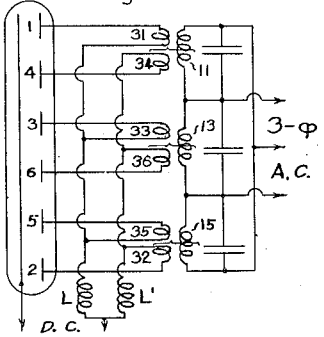
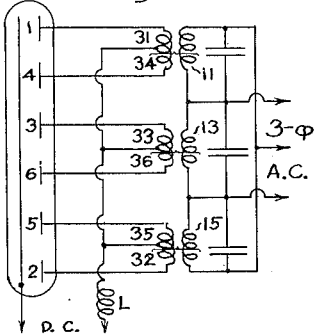
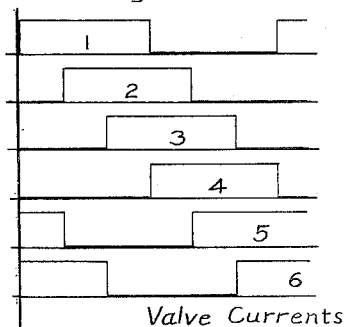
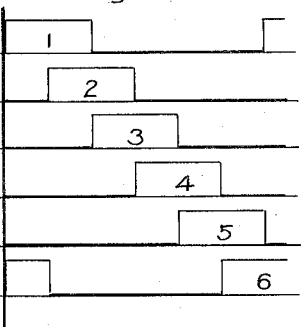
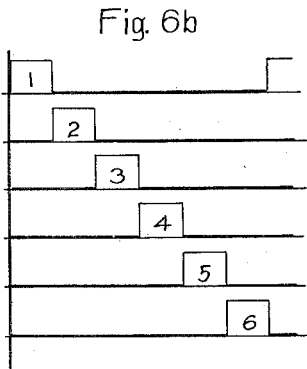
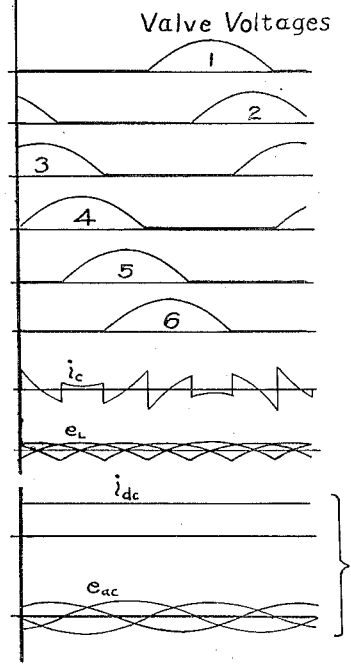
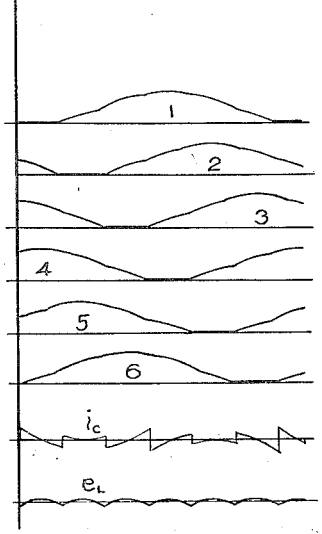
LOUIS A. HAZELTINE
*INVENTOR*
BY
*ATTORNEY*

April 18, 1933.   L. A. HAZELTINE   1,904,455
METHOD AND APPARATUS FOR CONVERTING ELECTRIC POWER
Filed July 5, 1923   15 Sheets-Sheet 3
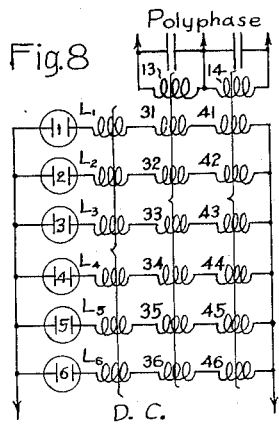
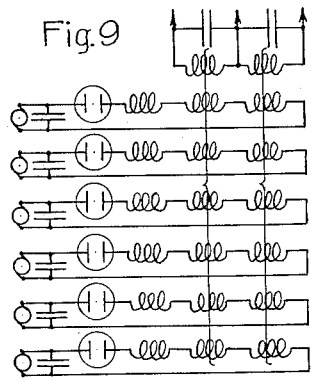
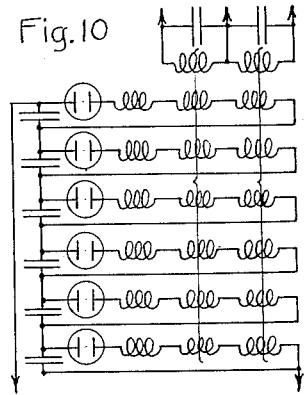
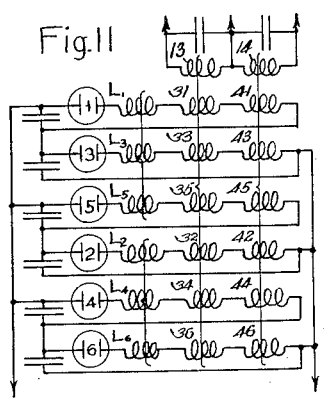
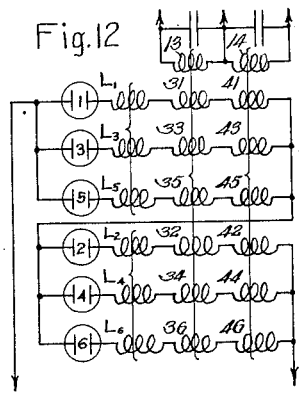
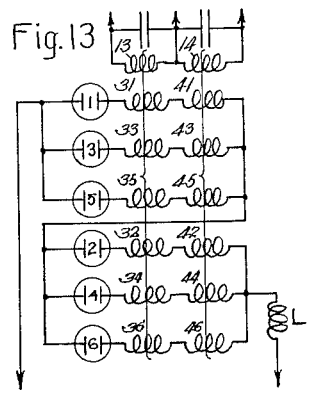
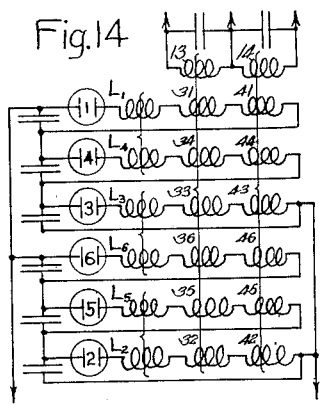
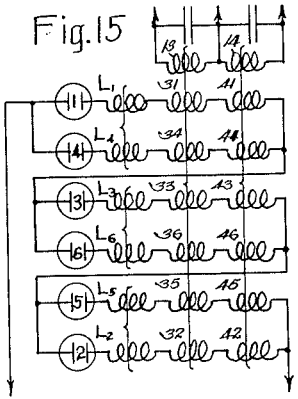
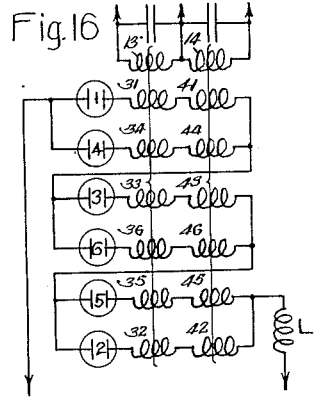
LOUIS A. HAZELTINE
*INVENTOR*
BY
*ATTORNEY*

April 18, 1933.  L. A. HAZELTINE  1,904,455
METHOD AND APPARATUS FOR CONVERTING ELECTRIC POWER
Filed July 5, 1923    15 Sheets-Sheet 4
Fig.17a
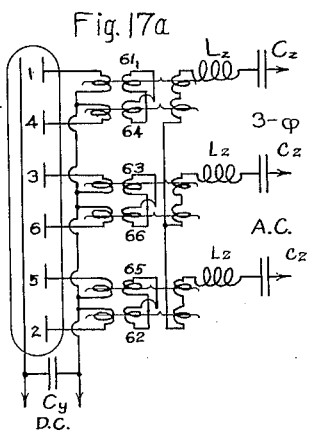
Fig.18a
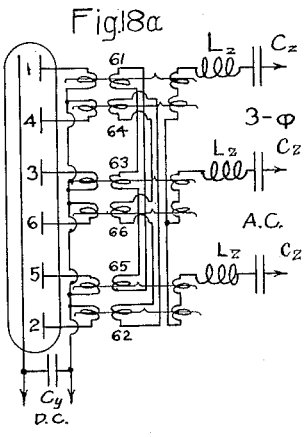
Fig.19a
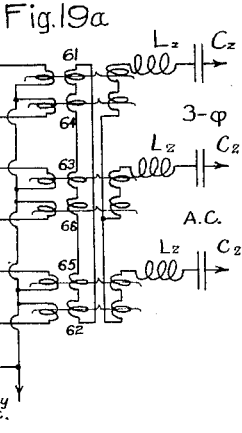
Fig.17b
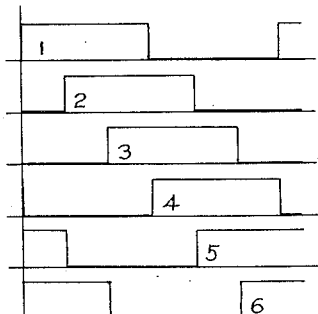
Fig.18b
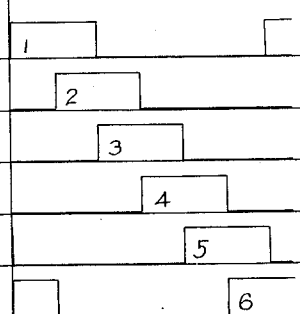
Fig.19b
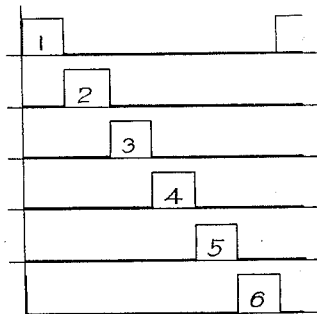
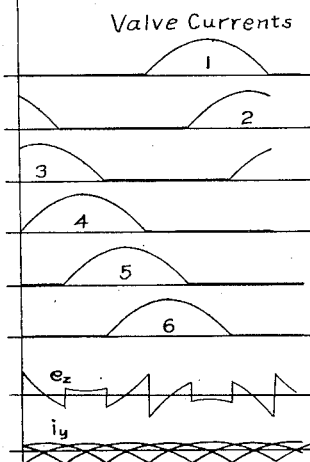
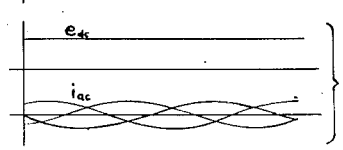
Fig.20
LOUIS A. HAZELTINE
INVENTOR
BY Pennie, Davis, Marvin & Edmonds
ATTORNEY April 18, 1933.   L. A. HAZELTINE   1,904,455
METHOD AND APPARATUS FOR CONVERTING ELECTRIC POWER
Filed July 5, 1923   15 Sheets-Sheet 5

LOUIS A. HAZELTINE
*INVENTOR*

BY
*ATTORNEY*

April 18, 1933.  L. A. HAZELTINE  1,904,455
METHOD AND APPARATUS FOR CONVERTING ELECTRIC POWER
Filed July 5, 1923   15 Sheets-Sheet 6
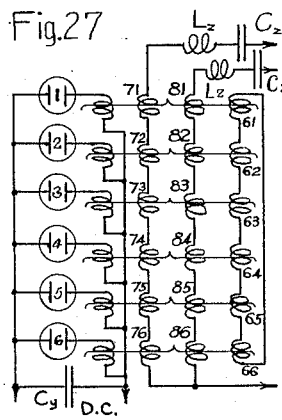
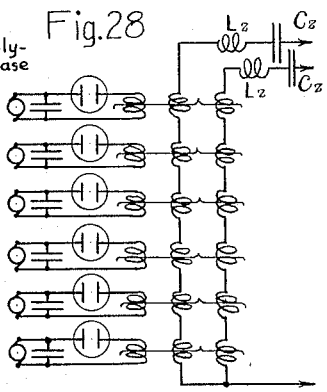
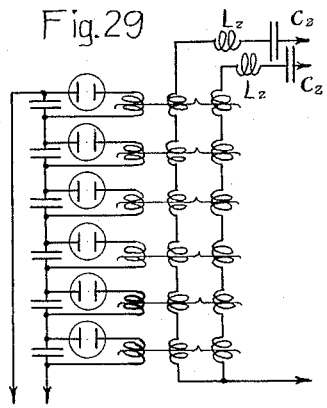
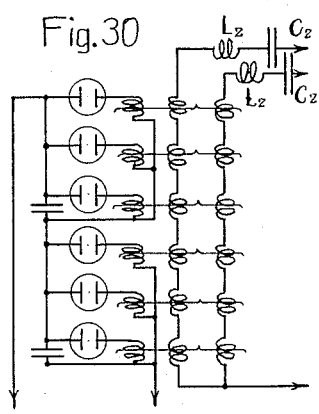
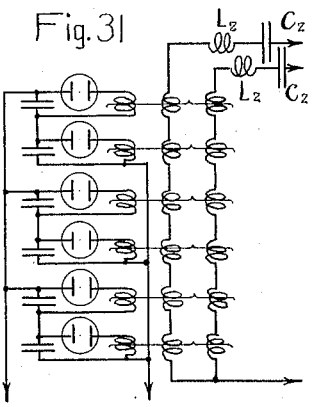
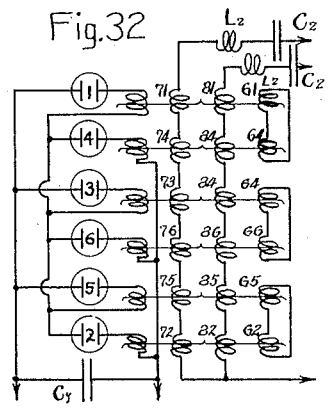
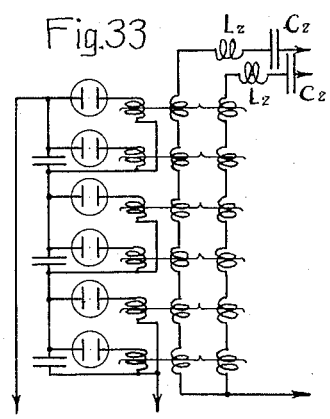
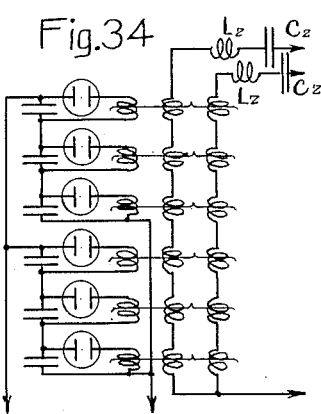
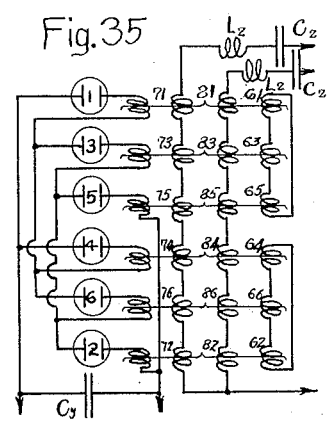
LOUIS A. HAZELTINE
INVENTOR
BY
ATTORNEY April 18, 1933.   L. A. HAZELTINE   1,904,455
METHOD AND APPARATUS FOR CONVERTING ELECTRIC POWER
Filed July 5, 1923   15 Sheets-Sheet 7
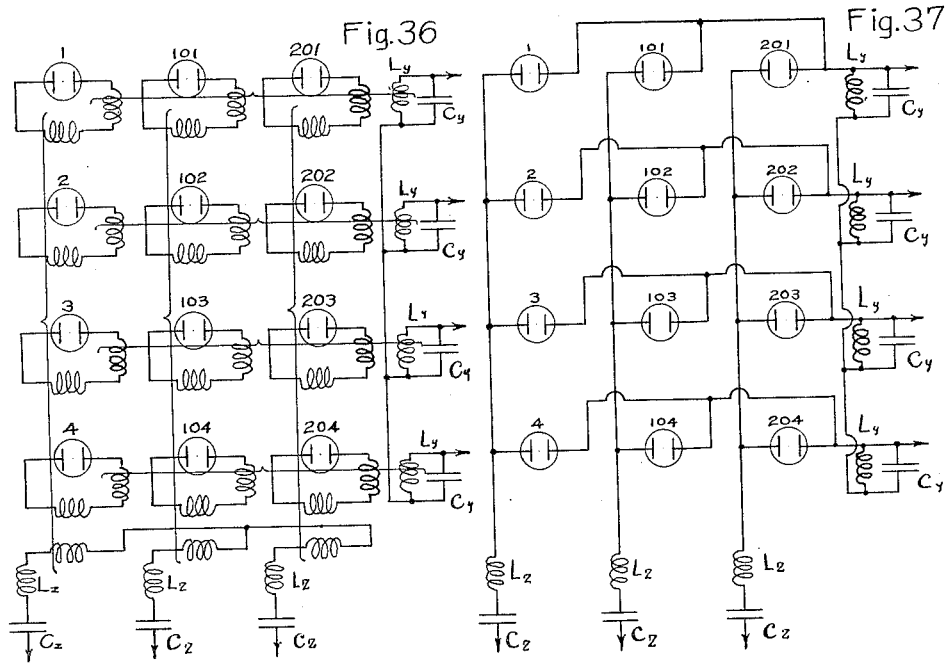
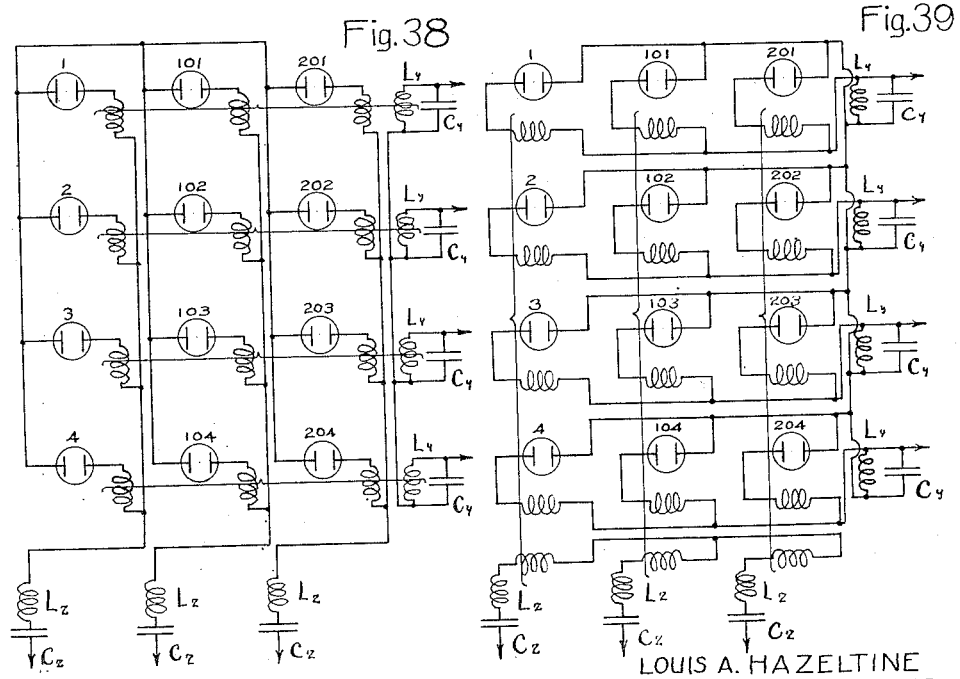
LOUIS A. HAZELTINE
INVENTOR
BY
ATTORNEY April 18, 1933.  L. A. HAZELTINE  1,904,455
METHOD AND APPARATUS FOR CONVERTING ELECTRIC POWER
Filed July 5, 1923  15 Sheets-Sheet 8
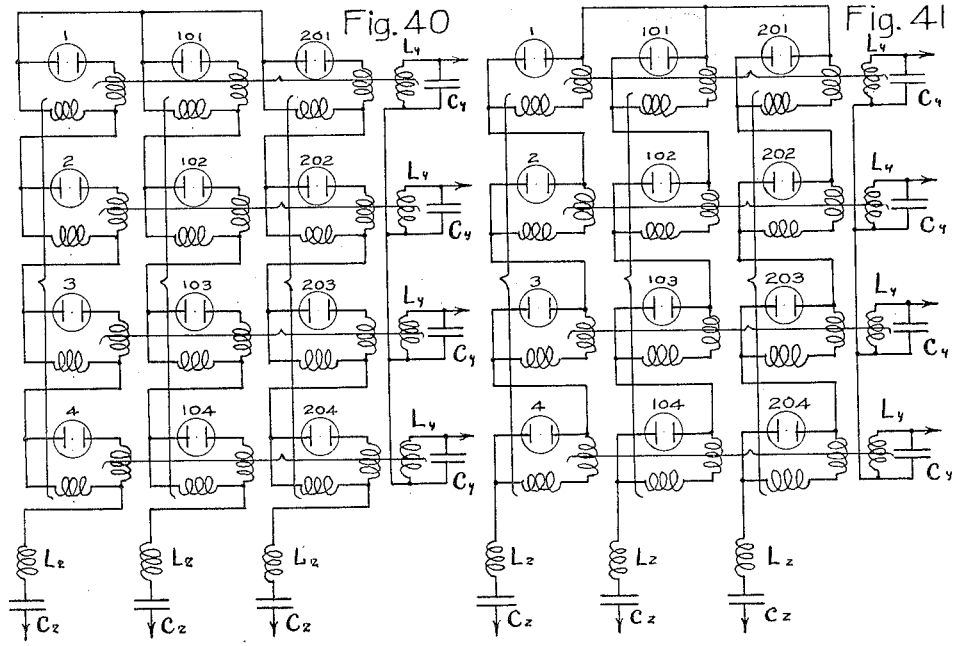
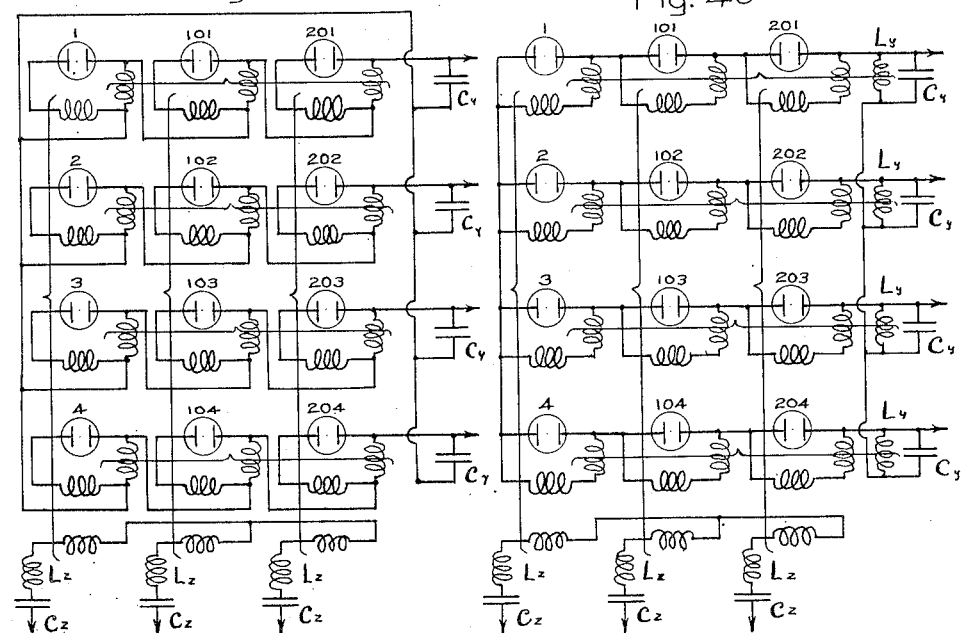
LOUIS A. HAZELTINE
INVENTOR
BY
ATTORNEY

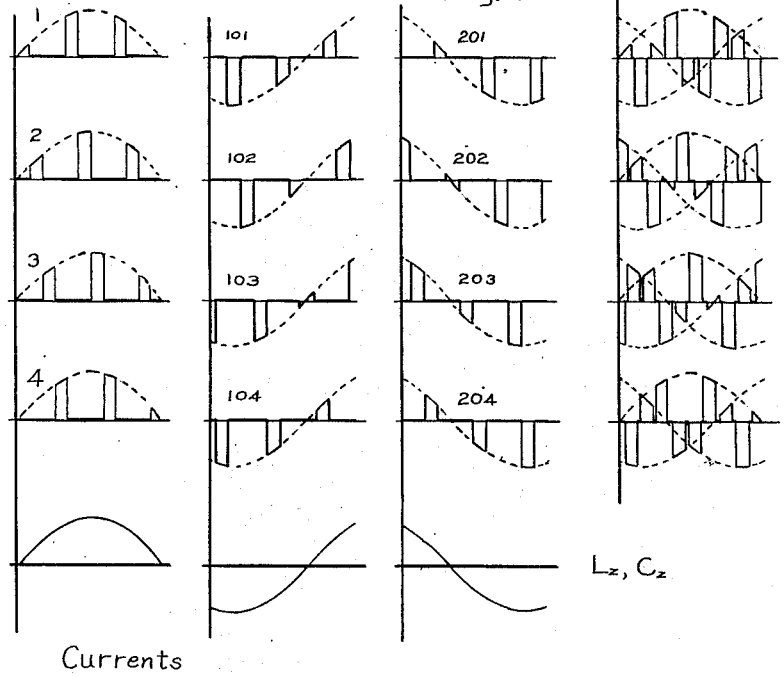
Fig.44
Currents
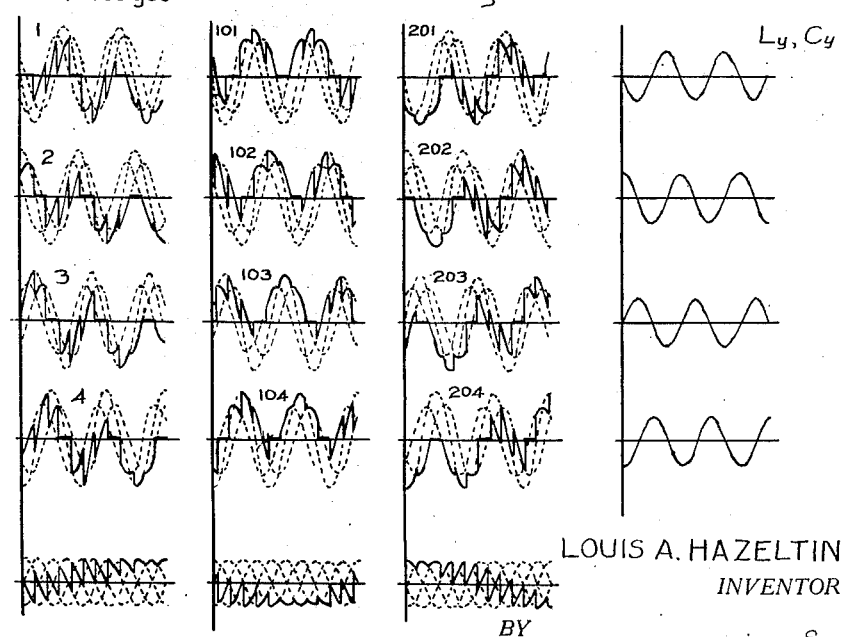
Voltages    Fig.45
LOUIS A. HAZELTINE
INVENTOR April 18, 1933.   L. A. HAZELTINE   1,904,455
METHOD AND APPARATUS FOR CONVERTING ELECTRIC POWER
Filed July 5, 1923    15 Sheets-Sheet 10
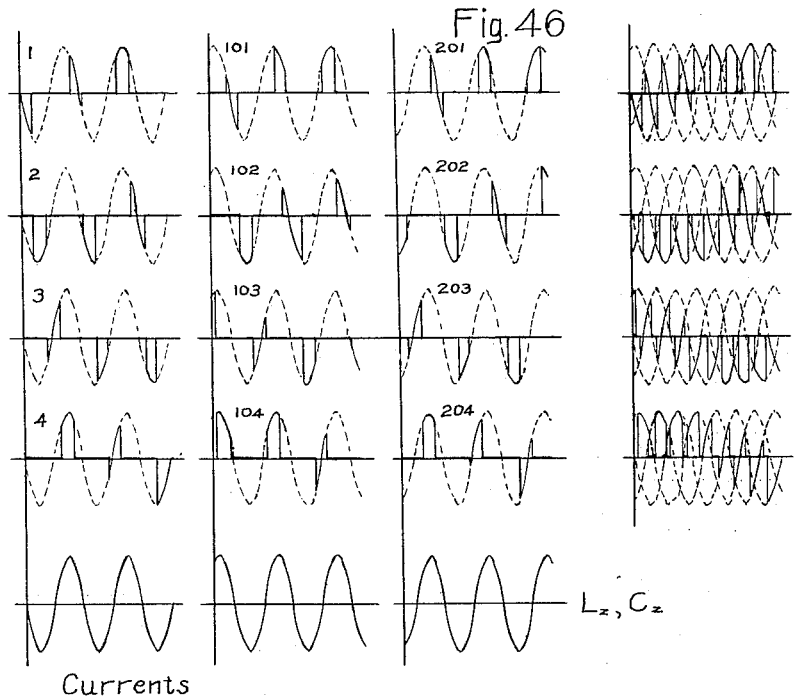
Currents
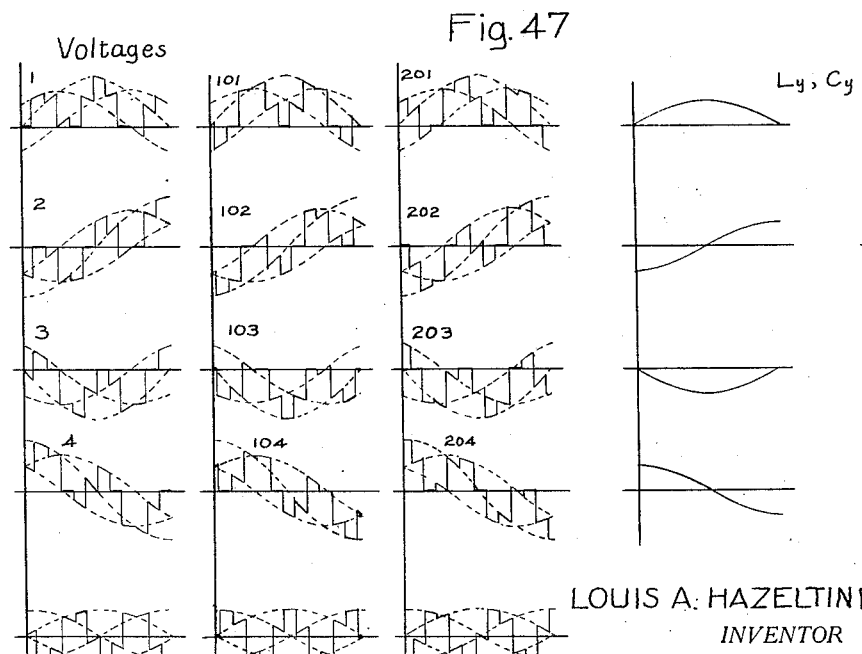
LOUIS A. HAZELTINE
INVENTOR
BY
ATTORNEY April 18, 1933.  L. A. HAZELTINE  1,904,455
METHOD AND APPARATUS FOR CONVERTING ELECTRIC POWER
Filed July 5, 1923   15 Sheets-Sheet 11

LOUIS A. HAZELTINE
*INVENTOR*

BY
*ATTORNEY*

April 18, 1933.   L. A. HAZELTINE   1,904,455
METHOD AND APPARATUS FOR CONVERTING ELECTRIC POWER
Filed July 5, 1923   15 Sheets-Sheet 12

LOUIS A. HAZELTINE
INVENTOR

April 18, 1933.   L. A. HAZELTINE   1,904,455
METHOD AND APPARATUS FOR CONVERTING ELECTRIC POWER
Filed July 5, 1923   15 Sheets-Sheet 13

LOUIS A. HAZELTINE
*INVENTOR*

BY
*ATTORNEY*

April 18, 1933.  L. A. HAZELTINE  1,904,455

METHOD AND APPARATUS FOR CONVERTING ELECTRIC POWER

Filed July 5, 1923  15 Sheets-Sheet 14

LOUIS A. HAZELTINE
INVENTOR

BY
*Pennie, Davis, Marvin & Edmonds*
ATTORNEY

April 18, 1933.  L. A. HAZELTINE  1,904,455

METHOD AND APPARATUS FOR CONVERTING ELECTRIC POWER

Filed July 5, 1923    15 Sheets-Sheet 15

Section "CD"

Section "AB"

LOUIS A. HAZELTINE
INVENTOR

BY
ATTORNEY

Patented Apr. 18, 1933

1,904,455

UNITED STATES PATENT OFFICE

LOUIS A. HAZELTINE, OF HOBOKEN, NEW JERSEY, ASSIGNOR TO GENERAL ELECTRIC COMPANY, A CORPORATION OF NEW YORK

METHOD AND APPARATUS FOR CONVERTING ELECTRIC POWER

Application filed July 5, 1923. Serial No. 649,536.

This invention relates to a method and apparatus for improving the efficiency of electric valve converters with a minimum production of current and voltage harmonics. It consists of improvements and extensions of the methods disclosed in United States Letters Patent No. 1,835,156, granted December 18, 1931.

Broadly speaking an electric valve is a device whose resistance can be controlled for the purpose of varying the current passing through it. An electric valve converter consists of one or more electric valves and associated circuits which convert one form of electric energy into another. Examples of electric valve converters are: (1) The mechanical commutator, which converts alternating current into direct current, direct current into alternating current, alternating current of one frequency into alternating current of another frequency, or alternating current from one phase of a polyphase system to another in such manner as to supply or absorb reactive power; (2) the arc rectifier, which converts alternating current into direct current; (3) the arc oscillator, which converts direct current into alternating current; (4) the vacuum-tube rectifier; (5) the vacuum-tube oscillator; (6) the vacuum-tube amplifier, which converts direct current into alternating current of electrically controlled wave form; (7) the microphone, which converts direct current into alternating current of sound-controlled wave form; and (8) the crystal rectifier, which usually converts modulated high-frequency alternating current into modulated direct current.

The resistance of an electric valve may vary gradually from one value to another, as in the amplifier and in the microphone, or abruptly from a very low value to a very high value, as conspicuously in the mechanical commutator. With gradual variation in resistance, there is necessarily a relatively large power loss in the valve itself, and high efficiency of conversion is impossible. On the other hand, with an abrupt change in resistance, the voltage drop in the valve will be small when the resistance is at its low value, and the current will be small (usually zero) when the resistance is at its high value (usually infinite); the power loss is thus low at all times and the efficiency of conversion is therefore high.

We may speak of an abruptly operated valve as being closed when its resistance is relatively low and as being open when its resistance is relatively high. Throughout the interval when the valve is closed, the desired voltages of the input and output circuits will not usually be equal; and for high efficiency the difference between these voltages must be absorbed in a highly reactive impedance. Throughout the interval when the valve is open, the desired currents of the input and output circuits will also not usually be equal; and their difference must be absorbed in a highly reactive admittance. If these means are not provided for absorbing voltage and current differences, then either a substantial power loss will exist in the valve or else the wave forms of input or output current and voltage will be distorted from the desired forms. In my patent referred to, are shown means for absorbing voltage differences (as the impedance coil 25, Fig. 8) and means for absorbing current differences (as the condenser 31, Fig. 8), the specific arrangement being an oscillator employing electrostatically controlled vacuum-tube valves, or triodes.

Certain conversions of electric power are attained by stationary apparatus involving only the phenomena of electromagnetic inductance and electrostatic capacity. These are: (1) The stepping up or down of alternating voltage; (2) the changing of one polyphase system to another; (3) the changing of a constant-voltage alternating current system to a constant-current alternating-current system, or vice versa; and (4) the supply or absorption of reactive power. All of these conversions occur without change in frequency and without change from polyphase to single-phase or vice versa.

Other conversions of electric energy are attained by electric valves. These are (1) the conversion of alternating current into direct current or vice versa; (2) the conversion of alternating current of one frequency into alternating current of another frequency; (3) the conversion of polyphase alternating current into single-phase alternating current of the same frequency, particularly a low frequency, or vice versa; (4) the stepping up or down of direct voltage; (5) the changing of a constant-voltage direct-current system to a constant-current direct-current system, or vice versa; (6) the conversion of direct current into alternating current of controlled wave form (e. g., voice current in telephony); (7) the supply or absorption of polyphase reactive power without corresponding energy storage (as in condensers or inductive coils respectively); (8) the change or reversal in the effective reactance of a coil or a condenser. These conversions may be combined in various ways. Only the first two of these conversions form the specific subject matter of the present invention; the remainder will be described specifically in applications for Letters Patent about to be filed.

As in my patent referred to above, which shows methods for converting direct-current power into alternating-current power, in all valve converters in circuits where the input and output voltages differ in wave form during the cyclic intervals when the valves are closed, a series impedance is required in one of the circuits to absorb this voltage difference; and where the input and output currents differ in wave form during the cyclic interval when the valves are open, a shunt admittance is required in the other of the circuits to absorb this current difference. The conversions considered in this patent application are all of this class, the alternating currents and voltages being sinusoidal and the direct currents and voltages being constant from instant to instant. These conversions have been applied in the past in certain fields, by the use of commutators, which are mechanically controlled valves, but the problem of wave form has either not entered or has not been completely solved. Furthermore the ordinary commutator has certain limitations, such as permitting only moderately low frequency, producing undesirable temporary short circuits between bars when these are spanned by a brush, and requiring operation in regular order and usually at equal time intervals. While this invention is applicable in some of its details to mechanically operated valves, its main purpose is to provide stationary valves and appropriate circuits, and specifically to provide a highly efficient form of electrostatically controlled valve converter of the thermionic type.

A specific application of the valve conversion of this invention is the operation of electric railways. The most desirable form of power transmission over considerable distances is by the use of three-phase alternating current, since alternating current is most easily transformed in voltage. The most desirable form of power for delivery to electric locomotives and cars is high-voltage direct-current, since this requires only a single contact conductor and avoids the interference with communication lines that is experienced with single-phase alternating current. The most desirable type of motor would be the polyphase squirrel-cage induction motor supplied with currents of adjustable frequency, since this motor has no sliding contacts and is most robust in construction, but requires variable frequency for efficient speed control. These conflicting demands for the form of power can be reconciled by the use of valve converters, first converting three-phase alternating-current into high-voltage direct current at sub-stations and then converting the direct current into variable-frequency polyphase current on the locomotive or cars.

The direct conversion between direct current and low-frequency alternating current requires a very large number of valves unless the voltage-absorbing and current-absorbing coils and condensers are made large; moreover, the residual harmonics with a small number of valves would have a frequency within the audible range and would therefore be likely to cause interference with telephone circuits. Further, the form of valve which forms part of this invention is most suited to moderately high control frequency. For these reasons the conversions at the sub-stations and on the electric locomotive or car are each made in two steps; at the sub-station the conversion is from low frequency to moderately high frequency and then from this high frequency to direct current; on the electric locomotive or car the conversion is the reverse, from direct current to moderately high frequency and from this high frequency to low variable frequency. These two conversions being the same in form, but reverse in sense, only the latter will be described in detail. On the electric locomotive all of the main circuit connections are permanent, thus avoiding heavy contacts and rheostat losses. The speed control is effected wholly by adjustments in the control electrode circuits, these electrodes being controlled ultimately through a commutator.

The valve forming a part of this invention is of the magnetically guided, electrostatically controlled, thermionic type, in which (when the valve is closed) the electrons are accelerated from the cathode by a highly positive control electrode (in the form of a grid), and are constrained to move along lines of magnetic flux so that they pass between the rods of the grid without reaching them, and then, being attracted by the control electrode, retard to a low velocity before reaching the anode. (Usually the main electrodes are each alternately anode and cathode and are therefore both maintained electron-emissive, as by heating.) In this way the voltage drop in the valve circuit is kept very low, and the grid current practically negligible, although the grid potential may be very high. Another feature of this valve is the enclosing of the electrodes within concentric metal shells which reflect back to the electrodes the heat developed by the losses, the design being such that this heat maintains the emission from the main electrodes.

It should be understood that the accompanying drawings, while they illustrate embodiments of the invention, show only a few of the many possible arrangements which achieve the same ends, but they illustrate the preferred forms for the more usual applications and the principles according to which other forms may readily be developed.

Referring to these drawings,

Fig. 1b is the same as Fig. 1b of the same patent, and shows the wave forms of current and voltage of Fig. 1a.

Figure 3A:
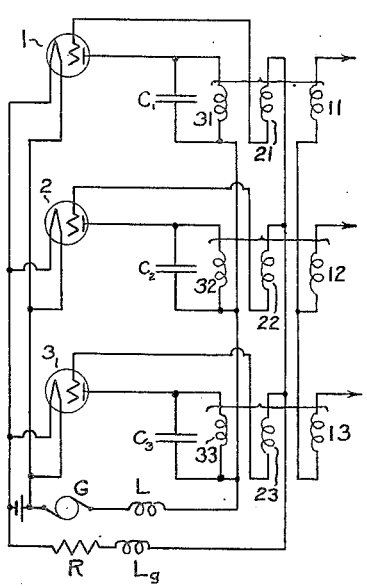
Figure 3B:
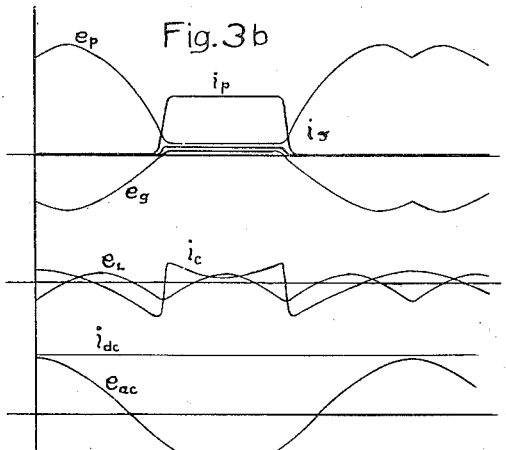

Fig. 3a also shows an oscillator for converting direct-current power into polyphase alternating-current power, but employs only three valves. Fig. 3b shows the wave forms of current and voltage of Fig. 3a.

Figure 2:
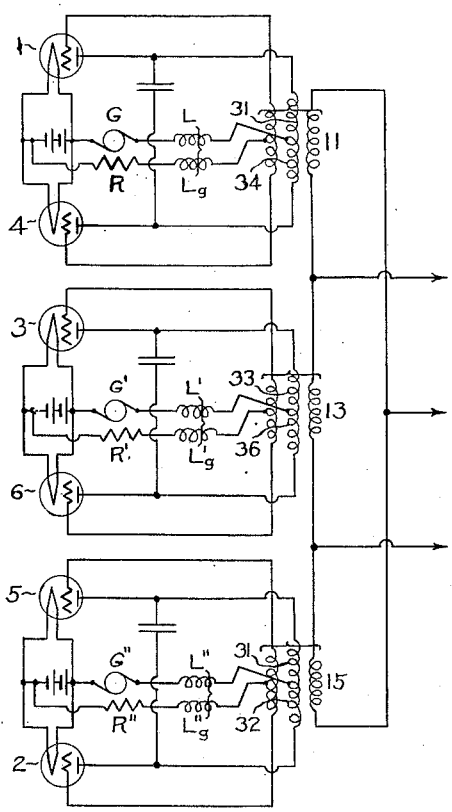
Fig. 2 is the same circuit as Fig. 9 of the same patent and illustrates a valve oscillator for converting direct-current power into polyphase alternating-current power.

Fig. 4a represents a valve converter like that of Fig. 2, but for power conversion in either direction. Fig. 4b shows the current and voltage waves of Fig. 4a.

Fig. 5a is a modification of Fig. 4a to give operation similar to that of Fig. 3a. Fig. 5b shows the current and voltage waves of Fig. 5a.

Fig. 6a is a further modification of Fig. 4a. Fig. 6b shows the current and voltage waves of Fig. 6a.

Fig. 7 shows the waves of direct current and alternating voltage for Figs. 4a, 5a and 6a.

Figs. 8–16 each shows a generalized direct-current-three-phase valve converter with various arrangements of the valves with respect to the direct-current circuit and with respect to the arrangement of the impedance coils.

Fig. 17a illustrates a direct-current-polyphase valve converter of the circuit-opening type, in contradistinction to the previous converters which are of the circuit-closing type. Fig. 17b shows the wave forms of voltage and current of Fig. 17a.

Fig. 18a shows a modification of the circuit of Fig. 17a, in which the interval of opening of each valve is changed. Fig. 18b shows the wave forms of voltage and current of Fig. 18a.

Fig. 19a shows another modification of Fig. 17a. Fig. 19b shows the wave forms of voltage and current of Fig. 19a.

Fig. 20 shows the waves of direct voltage and alternating current for Figs. 17a, 18a and 19a.

Figure 21:
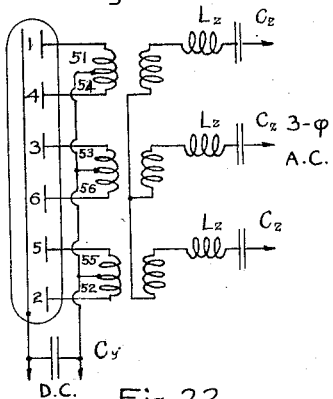
Figure 22:
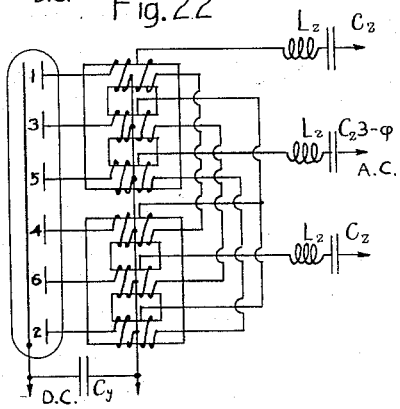
Figure 23:
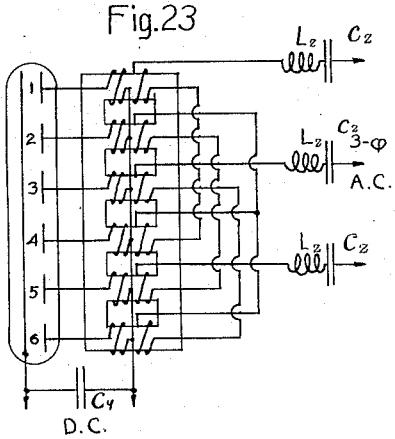

Figs. 21, 22 and 23 show modifications of the circuits of Figs. 17a, 18a and 19a respectively.

Figure 24:
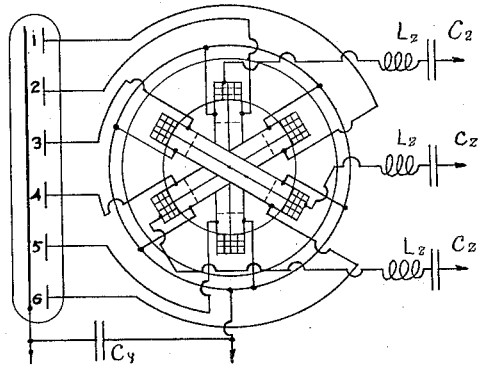
Figure 25:
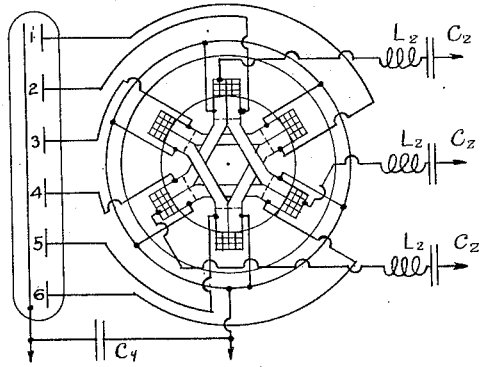
Figure 26:
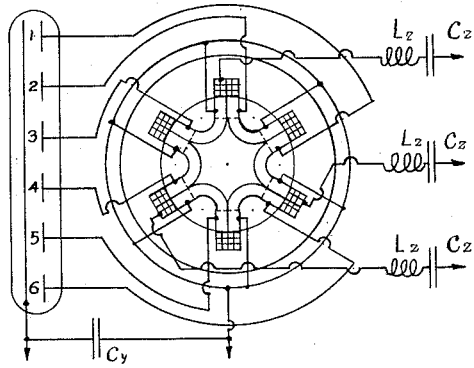

Figs. 24, 25 and 26 also show modifications of the circuits of Figs. 17a, 18a and 19a respectively.

Figs. 27–35 each shows a generalized circuit-opening direct-current-polyphase valve converter with various arrangements of the valves with respect to the direct-current circuit and with respect to the arrangement of the tertiary circuits.

Figs. 36–43 show polyphase-polyphase circuit-closing valve converters with various arrangements of the valves with respect to the input and output circuits.

Figs. 44 and 45 show the wave forms of current and voltage respectively, for Figs. 36–43, when the impedance side of the converter has the lower frequency.

Figs. 46 and 47 show the wave forms of current and voltage respectively, for Figs. 36–43, when the impedance side of the converter has the higher frequency.

Figs. 48–53 show polyphase-polyphase circuit-opening valve converters with various arrangements of the valves with respect to the input and output circuits.

Figure 54:
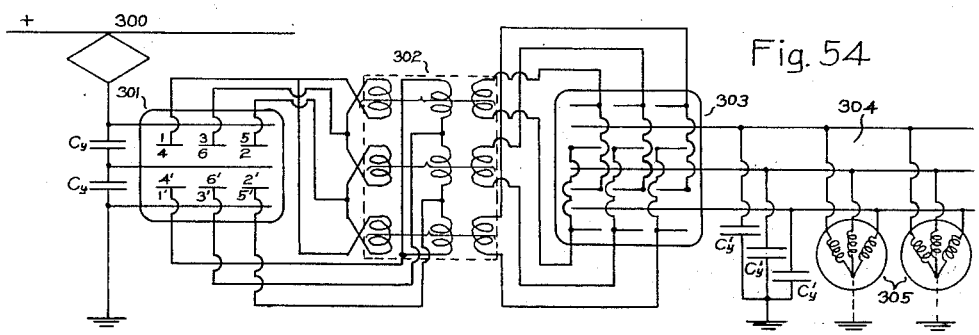

Fig. 54 shows the main circuits of a preferred arrangement for converting direct-current power in two steps into variable-frequency polyphase power for operating squirrel-cage induction motors on an electric locomotive.

Figure 55:
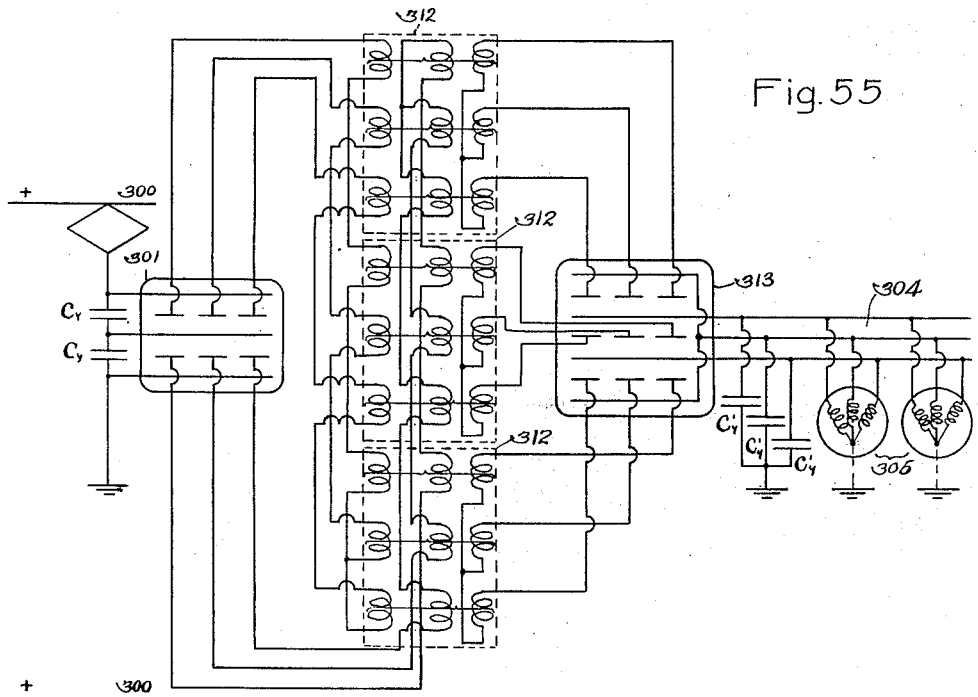

Fig. 55 shows an alternative to Fig. 54.

Figure 56:
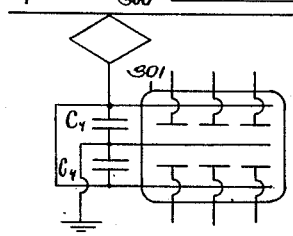

Fig. 56 shows a modification of the direct-current valve structure of Fig. 54 or 55 to suit it to operation at one-half the voltage.

Figure 57A:
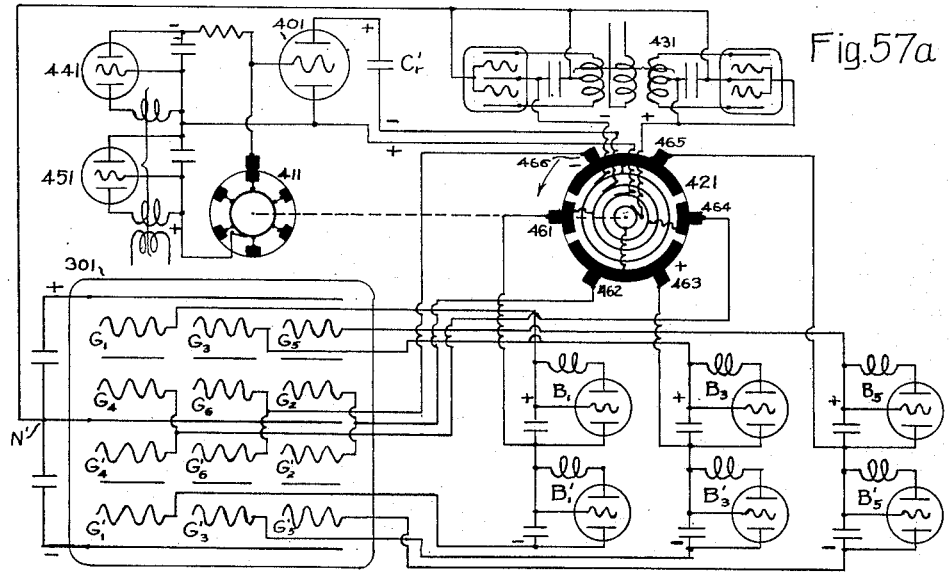
Figure 57B:
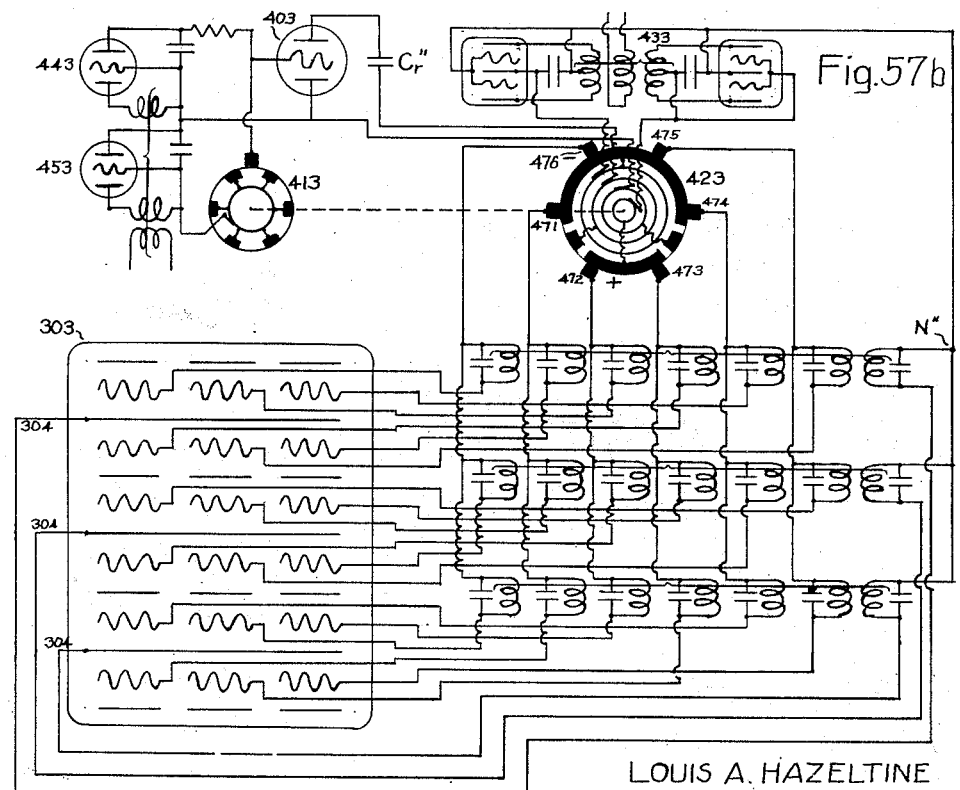

Fig. 57a shows the control electrode circuits for the direct-current valve structure of the converter of Fig. 54. Fig. 57b shows the control electrode circuits for the alternating-current valve structure of the converter of Fig. 54.

Figure 58A:
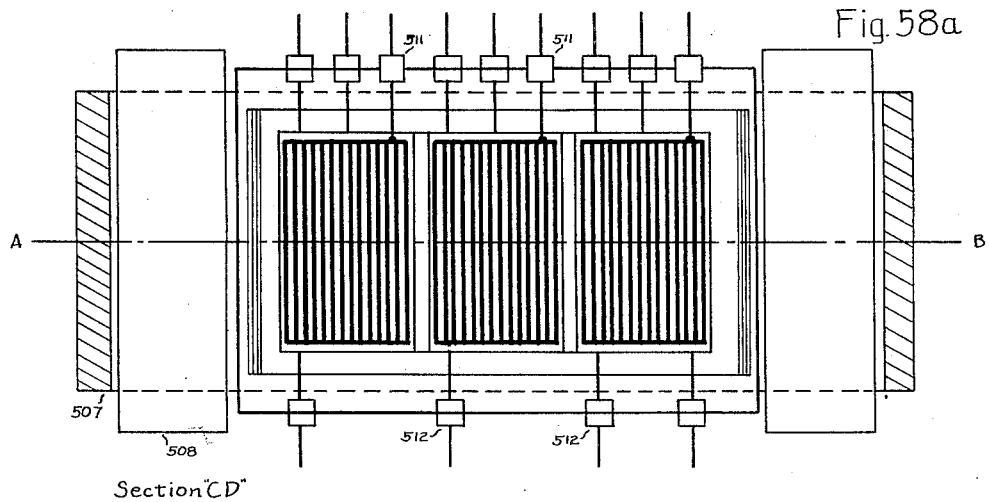
Figure 58B:
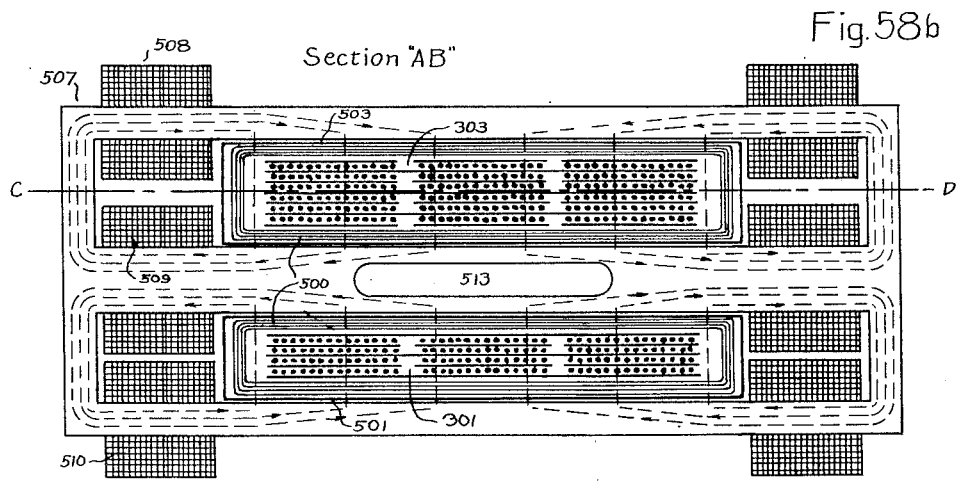

Fig. 58a shows an elevation in section of the complete valve structure of Fig. 54. Fig. 58b shows a plan in section corresponding to Fig. 58a.

Figure 59:
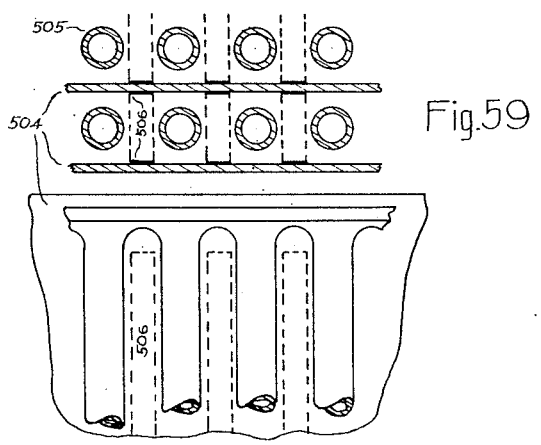

Fig. 59 is a detail in plan and elevation of the valve structure of Figs. 58a and 58b.

Figure 1A:
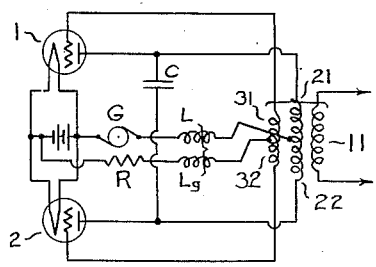
Fig. 1a is the same circuit as Fig. 8 of my patent referred to above and illustrates a valve oscillator for converting direct-current power into single-phase alternating-current power, particularly of high frequency.
Figure 1B:
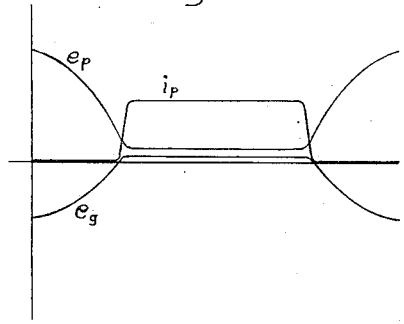

Referring to Fig. 1a, 1b and 2 represent electrostatically controlled valves each having a cathode in the form of a heated filament, an anode in the form of a plate, and a control electrode in the form of a grid interposed between the cathode and the anode.

Under the control of the grids, the anode circuits of the two valves open and close alternately and so permit the direct current from generator G to flow alternately through the two halves 31, 32 of the primary coil. These primary currents together act like an alternating current and induce an alternating current in secondary coil 11, which supplies a load to be connected at the right. If the direct-current generator is to have a constant current and a constant voltage from instant to instant and the alternating current load is to have a sinusoidal current and a sinusoidal voltage from instant to instant, and the valves are to operate substantially as ideal valves without absorption of current or voltage, it is necessary to provide the condenser C to absorb the difference between the rectangular interrupted direct current and the sinusoidal alternating current, and to provide the impedance coil L to absorb the difference between the constant direct voltage and the half-sinusoidal rectified alternating voltage. On account of the phase relations demanded by the connection of the control electrodes to the coils 21, 22 of the output transformer, the frequency will automatically adjust itself so that the condenser C is resonant with the transformer primary coil 31, 32 and its load; a large capacity and a low primary self-inductance are desirable, as affording a high admittance to the harmonic currents to be absorbed. As high a value of self-inductance at L as is consistent with a low resistance is desirable, as affording a high impedance to harmonic voltages. The wave forms of the valve or anode current $i_p$, the valve voltage or anode potential $e_p$, and the control electrode potential $e_g$, as actually obtained, are shown in Fig. 1b.

Fig. 2 consists simply of three single-phase valve oscillators, like that of Fig. 1a coupled by connecting secondary coils 11, 13, 15, in delta to synchronize them and to provide a three-phase oscillator. A triple-frequency current flows in this delta and so relieves the condensers of such harmonics.

Fig. 3a is like Fig. 1a except that three valves are employed instead of two, and three separate transformers, each with a shunting condenser, are employed in place of the single transformer with the middle tap. This arrangement gives a three-phase oscillator in place of the symmetrical single-phase oscillator of Fig. 1a. The three valves 1, 2 and 3, or anode circuits, are closed in succession, each for one-third of a cycle, thereby causing the constant current of generator G to be broken up into three rectangular current lobes in the three primary coils 31, 32 and 33. These currents induce three-phase secondary current, in coils 11, 12 and 13, which are to be connected to a three-phase load at the right. Coils 21, 22 and 23 of the same transformer supply potentials of the proper phase to the three control electrodes. As in Fig. 1a, condensers $C_1$, $C_2$ and $C_3$ are required to absorb the differences between the rectangular interrupted direct currents and the sinusoidal currents demanded by the load. Also, as in Fig. 1a, the impedance coil L is required to absorb the difference between the constant direct voltage and the rectified sinusoidal voltages of the transformer primary coils. (In both figures, the coil L may connect to some other point of the transformer primary coil than the neutral point, but it will then be called on to absorb some of the fundamental sinusoidal voltage in addition to the harmonics.) Again, as in Fig. 1a, the control electrode circuit requires an impedance coil $L_g$, for the same general purpose as the coil L of the anode circuit, and a resistance R to give the control electrodes a negative bias. As in Figs. 1a and 2 the coils L and $L_g$ may or may not be coupled. If they are coupled, the resistance R serves the additional purpose of preventing single-phase oscillation in which the coil L and the inherent capacities constitute the resonant circuit. As an alternative, as in Figs. 1a and 2, coil $L_g$ may be omitted, with only a slight effect on the operation, resistance R then serving the purpose of absorbing the voltage differences.

At the bottom of Fig. 3b are shown the wave forms of the constant direct current $i_{dc}$ and the sinusoidal voltage $e_{ac}$ of one phase. The wave forms of valve or anode current $i_p$, valve voltage or anode potential $e_p$, and the control electrode potential $e_g$, are shown in the upper part of Fig. 3b and are generally similar to those of Fig. 1a, but the current flows for one-third of a cycle instead of one-half, and the voltages consist of sinusoidal arcs for the other two-thirds of a cycle. The middle curves of Fig. 3b show the wave forms of the current $i_c$ absorbed in one condenser and the voltage $e_L$, absorbed in the impedance coil L.

Fig. 4a is the same as Fig. 2 except in form: in place of six separate valve structures a single structure is shown; in place of three separate generators a single direct-current circuit "D. C." is shown; and the condensers are connected in the alternating-current line circuit instead of in the local valve circuit, this change being optional. Fig. 4a, however, is intended to be broader than Fig. 2 in that the valve control may be of any desired character, such as electrostatic (with the interposition of control electrodes), magnetic, mechanical, or automatic (as in arc oscillators and rectifiers); and further, the valve converter may be either an oscillator, converting direct-current power into alternating-current power, or a rectifier, converting alternating-current power into direct-current power.

The wave forms of the direct current $i_{dc}$ and the three sinusoidal voltages $e_{ac}$ of the alternating current circuit are shown in Fig. 7, which to different scales applies to Figs. 4a, 5a and 6a. The wave forms of all valve currents are shown in the upper part of Fig. 4b; and the waves of all valve voltages are shown in the middle of this figure. These wave forms are the same as those of Fig. 1b but are idealized, the valves being taken to have zero voltage drop when the current is flowing, and the control being taken to operate instantaneously. The wave form of one condenser current $i_c$ and the wave forms of the three impedance-coil voltages $e_L$ are shown at the bottom of Fig. 4b.

The circuit of Fig. 5a is like that of Fig. 3a doubled, but with a single valve structure and with the transformer coils in the alternating-current line connected in delta. As in Fig. 4a, the valves may be controlled in any manner and may serve to convert power in either direction. The two impedance coils L and L' are not coupled.

The wave forms of currents and voltages of Fig. 5a are shown in Fig. 5b. These are the same as those of Fig. 3b idealized, except for their greater number and for the condenser current $i_c$ which contains no even harmonics, these being canceled out in the two primary coils of each transformer.

Fig. 6a has the same valve structure as Figs. 4a and 5a and serves the same purpose. However, in place of three and two impedance coils, respectively, it has only a single impedance coil L. This arrangement causes each valve current to flow for one-sixth of a cycle, as represented at the top of Fig. 6b. The valve voltages are then zero for this sixth of a cycle, as represented in the middle of Fig. 6b. At the bottom of this figure is shown the wave form of one condenser current $i_c$, which is the difference between the sinusoidal alternating current between the two upper lines and the current of transformer coil 11, which balances the two rectangular currents of coils 31 and 34. At the bottom of this figure is also shown the wave form of the impedance coil voltage $e_L$, which is the difference between the constant direct voltage and the six rectified sinusoidal voltages impressed successively from the transformer coils 31 to 36.

The waves $i_c$ of Figs. 4b, 5b and 6b contain only harmonics of orders greater or less by one than a multiple of six,—that is, harmonics of orders 5, 7, 11, 13, etc. In Figs. 4b and 5b, those harmonics that are not common to the different waves $e_L$ are canceled out with respect to the direct-current circuit by the connection of the different L's to a common point; so the only harmonics that may reach the external circuit are the same as in the wave $e_L$ of Fig. 6b and are of orders which are a multiple of six. These results are in accordance with the general theory of the cancellation of harmonics, as given later.

All waves of Figs. 4b, 5b and 6b are for unity power-factor, as ordinarily occurs in self-controlled oscillators and rectifiers. If the power-factor is not unity, the waves of valve voltage and of impedance-coil voltage will consist of other arcs of sinusoids than those shown.

Figs. 8 to 16 show circuits whose valves operate at the same intervals and for the same durations as those of Figs. 4a, 5a and 6a, in accordance with the couplings of the coils $L_1$ to $L_6$. In Figs. 8, 9, 10, 11 and 14 these coils may be coupled in any of three ways: forming one group of six as indicated in Fig. 8, which is equivalent to inserting a single impedance coil in the "D. C." line circuit and which therefore causes the operation to be like that of Fig. 6a; forming two groups of three coils each as indicated in Fig. 11, which has an equivalent effect on operation to the two coils L and L' of Fig. 5a; or forming three groups of two coils each as indicated in Fig. 14, which has an equivalent effect on operation to the three coils L, L' and L'' of Fig. 4a. Some form of coupling between these impedance coils, however, is essential. These five figures show essentially how valves can be connected in various ways with respect to the direct-current circuit; this connection being independent of the grouping of the impedance coils $L_1$ to $L_6$. In Fig. 8 all valves are in parallel with respect to the direct-current circuit, as was the case in Figs. 1a, 3a, 4a, 5a, and 6a. In Fig. 9 each valve is connected to a separate direct-current circuit; in this case the sum of six, three, or two valve currents (according to the mode of coupling the impedance coils) is constant, but as the individual valve currents are not constant, condensers are required across each direct-current circuit to absorb current variations. If the six direct-current circuits of Fig. 9 are connected in series, to form a single direct-current circuit, Fig. 10 is obtained; if the direct-current circuits of Fig. 9 are connected two in series and three sets in parallel, Fig. 11 is obtained; while if the direct-current circuits of Fig. 9 are connected three in series and two sets in parallel, Fig. 14 is obtained.

Fig. 12 shows three valves in parallel, two groups in series, with respect to the direct-current circuit. With the impedance coils coupled as shown they may be replaced by a single impedance coil L, as shown in Fig. 13.

Fig. 15 shows two valves in parallel, three groups in series, with respect to the direct-current circuit. With the impedance coils coupled as shown, they may be replaced by a single impedance coil L, as shown in Fig. 16. The impedance coils L in Figs. 13 and 16 absorb the harmonic voltages of all series-connected groups.

The wave forms of the valve currents and voltages in Figs. 8–16 are those of Fig. 6b if the impedance coils are coupled as in Fig. 8; they are those of Fig. 5b if the impedance coils are coupled as in Figs. 11 and 12; and they are those of Fig. 4b if the impedance coils are coupled as in Figs. 14 and 15.

In Figs. 8–16, some of the harmonics present in the current of the transformer coils 31—36 are conceled out in these coils; so the condenser shunted across the alternating-current line coil 13 of this transformer is not required to absorb these current harmonics. The mathematical theory of this effect is developed below with the following notation. (The numbers given in parentheses, for an example, after $p$ and $w$ refer to cases when the impedance coils are coupled as illustrated in Figs. 11 and 12.)

$p$, number of phases per group (=3);
$r$, ordinal number in above 1, 2, ... $p$;
$w$, number of groups (=2);
$u$, ordinal number in above, 1, 2 ... $w$;
$pw$, therefore, total number of phases ($3 \times 2 = 6$);
$\omega t$, angular time;
$n$, order of harmonic;
$m$, any whole number;
$\alpha$, phase angle of control operation;
$N$, $\Theta$, constants relating to transformer coils;
$I$, current of each valve, when this is closed.

The current $I$ is flowing through the $r$ valve of the $u$ group from the angular time $$\frac{2\pi(rw+u)}{pw} + \alpha \quad \text{to} \quad \frac{2\pi(rw+u)}{pw} + \alpha + \frac{2\pi}{p}.$$

By Fourier's Theorem, the coefficient of the $n$th harmonic, expressed as a complex quantity, is then $$\frac{1}{\pi} \int_{\frac{2\pi(rw+u)}{pw}+\alpha}^{\frac{2\pi(rw+u)}{pw}+\alpha+\frac{2\pi}{p}} I\epsilon^{jn\omega t} = \frac{I}{j\pi n}\left\{\epsilon jn\left[\frac{2\pi(rw+u)}{pw}+\alpha+\frac{2\pi}{p}\right] - \epsilon jn\left[\frac{2\pi(rw+u)}{pw}+\alpha\right]\right\}$$

The two exponential terms are represented by unit vectors differing in angle by $$\frac{2\pi n}{p}.$$

Their difference is represented by a vector at right angles ahead of their mean angle and having a length equal to twice the sine of half the angle between them. Hence the harmonic coefficient is $$\frac{2I}{\pi n} \sin \frac{\pi n}{p} \epsilon jn\left[\frac{2\pi(rw+u)}{pw}+\alpha+\frac{\pi}{p}\right].$$

The number of turns on the valve coils (as 31—36) of each transformer are such as to make the alternating voltages of the valves equal in magnitude and with equal successive phase differences, and may be expressed as $$N \cos\left[\frac{2\pi(rw+u)}{pw}+\Theta\right],$$

where $\Theta$ is different for each transformer and where a negative value indicates a reversal in polarity. Now let the above current flow through the coil of one transformer having this number of turns. The coefficient of the $n$th harmonic of the ampere-turns of all valve coils of this transformer is then $$\sum_1^{pw} rw+u \; N \cos\left[\frac{2\pi(rw+u)}{pw}+\Theta\right] \cdot \frac{2I}{\pi n} \sin \frac{\pi n}{p} \epsilon jn\left[\frac{2\pi(rw+u)}{pw}+\alpha+\frac{\pi}{p}\right] =$$

$$\frac{NI}{\pi n} \sin \frac{\pi n}{p} \sum_1^{pw} rw+u \left\{\epsilon jn\left[\frac{2\pi(rw+u)}{pw}+\alpha+\frac{\pi}{p}\right] + j\frac{2\pi(rw+u)}{pw}+j\Theta + \epsilon jn\left[\frac{2\pi(rw+u)}{pw}+\alpha+\frac{\pi}{p}\right] - j\frac{2\pi(rw+u)}{pw}-j\Theta]\right\}.$$

The terms of each of the sums are represented by unit vectors at equal angular differences, and form a closed polygon except when their angular difference is a multiple of $2\pi$. Thus the sum is zero except when $$\frac{n+1}{pw} = m,$$

a whole number, for the first sum, or $$\frac{n-1}{pw} = m,$$

for the second sum. These cases may be expressed together as $$n = mpw \mp 1.$$

In either of these cases the vectors are all at the same angle and give for the harmonic coefficient $$\frac{NI}{\pi} \frac{pw}{mpw \mp 1} \sin \frac{\pi(mpw \mp 1)}{p} \epsilon j(mpw \mp 1)\left(\alpha + \frac{\pi}{p}\right) \pm j\Theta = \mp$$

$$\frac{NI}{\pi} \frac{pw}{mpw \mp 1} \sin \frac{\pi}{p} \epsilon j(mpw \mp 1)\alpha \mp j\frac{\pi}{p} \pm j\Theta.$$

This total value of current-turns must be magnetically balanced by the alternating current of the transformer coil (as 13) connected to the alternating current line. Therefore all harmonics of current will be absent from this coil and from the condenser shunted across it, except those whose orders are greater or less by one than a multiple of the number of valve phases; and these harmonics have magnitudes inversely as their orders. The number and arrangement of the phases in the polyphase lines are immaterial in respect to this rule which evidently includes the results previously given for the specific circuits of Figs. 4a, 5a and 6a.

The presence of harmonics in the voltages of the direct-current circuits of the preceding valve converters comes under the rules given later in connection with the general circuit-closing valve converters, Figs. 36 to 43.

Figs. 17a, 18a and 19a show forms of a type of valve converter circuit differing essentially from those previously considered; for here the valve circuits are open for some sub-multiple of a cycle, while in the previous circuits the valves were closed for some sub-multiple of a cycle. The valves from Fig. 1a to Fig. 16 may be termed circuit-closing, while the valves of Figs. 17a, 18a and 19a may be termed circuit-opening. In a direct-current circuit-closing valve converter, each valve closes the circuit for a fraction of a cycle equal to the reciprocal of the number of valves in a group (a group being made up of the valves associated with an impedance coil or with coupled impedance coils in such manner that the valve currents are forced to add up to a constant). On the other hand, in a direct-current circuit-opening valve converter, each valve opens the circuit for a fraction of a cycle equal to the reciprocal of the number of valves in a group (a group being made up of a number of valves whose voltages are forced by the circuit arrangement to add up to a constant). Thus, in Fig. 17a the alternating components of the voltages of valves 1 and 4 are forced to be equal and opposite by reason of the parallel connection of the tertiary coils 61 and 64; in Fig. 18a the alternating components of the voltages of valves 1, 3 and 5 are forced to add up to zero by reason of the closed tertiary circuit 61, 63, 65; and in Fig. 19a the alternating components of the voltages of all six valves are forced to add up to zero by reason of the single closed tertiary circuit 61—66. Like the circuit-closing valve converters, the circuit-opening valve converters have a series impedance on one side and a shunt admittance on the other, but now the series impedance is on the alternating-current side (coil $L_z$ and condenser $C_z$, Figs. 17a, 18a, 19a), and the shunt admittance is on the direct-current side ($C_y$, Figs. 17a, 18a, 19a). When any valve is closed in these figures the constant direct voltage ($e_{dc}$, Fig. 20, to different scales for the three figures) is impressed directly on the transformer associated with that valve and thence by transformation on the valve which is open. The voltage waves therefore have the forms indicated at the tops of Figs. 17b, 18b, and 19b. The impedance coils $L_z$ and condensers $C_z$ are preferably made resonant to the frequency of the alternating-current circuit, so that the currents which they pass will be substantially sinusoidal ($i_{ac}$, Fig. 20). The currents which exist by transformation in the valves are therefore made up of sinusoidal arcs, as represented in the middles of Figs. 17b, 18b and 19b. The impedance coils $L_z$ and condensers $C_z$ absorb the difference between the sinusoidal alternating voltages and the rectangular interrupted direct voltage, one of these differences being represented by the wave $e_z$ at the bottoms of Figs. 17a, 18a and 19a. The voltages $e_z$ contain no third harmonics, for the reason that any third harmonics that may be present in the individual voltages are canceled out in the voltages between lines, due to the Y connection of the transformer coils in the alternating-current line circuit. The condenser $C_y$ absorbs the difference between the constant direct current and the resultant of the rectified sinusoidal currents, as represented by the wave $i_y$ at the bottom of Fig. 19b. The tertiary circuits also form local admittances and take harmonics of current, as represented by the respective sets of waves $i_y$ at the bottoms of Figs. 17b, 18b and 19b. It will be observed that the wave forms of Figs. 17b–19b are the same as those of Figs. 4b–6b, except that current and voltage are interchanged. The wave forms of current are for the condition of unity power factor. For other power factors the valve currents would be made up of other arcs of sinusoids, and would then be reversed in direction during part of each cycle. This would require a valve which would permit current to flow in either direction, as by having both anode and cathode electron-emissive, as by heating the valve structure of Figs. 58a and 58b.

Fig. 21 is a modification of Fig. 17a which avoids a tertiary circuit by placing the two associated valve coils 51 and 54 on the same iron core, which forces their voltage to be equal and opposite. In the same way Figs. 22 and 23 avoid the tertiary circuits of Figs. 18a and 19a by the use of polyphase transformer cores which force the fluxes, and therefore the voltages, of the different phases to add up to zero. These transformers are taken as having negligible magnetic leakage between ends.

Figs. 24, 25 and 26 are like Figs. 21, 22 and 23 except that the transformer cores are built like those of induction regulators, the primary and secondary windings being arranged in large slots whose openings come together. The line coils are shown in section and are supposed to be Y-connected as in the preceding figures. The pitch of the valve coils in each figure, measured in electrical space degrees, is equal to the interval during which the valve is to be open, measured in electric time degrees.

Figs. 27 to 35 show circuits whose valves operate at the same intervals and for the same duration as those of Figs. 17a, 18a and 19a. Except in Figs. 32 and 35 (where the tertiary circuits must be arranged as shown), the tertiary circuits in all of these figures may be arranged in any of three ways: forming one group of six as indicated in Fig. 27, which causes the operation to be like that of Fig. 19a; forming two groups of three coils each as indicated in Fig. 35, which causes the operation to be that of Fig. 18a; or forming three groups of two coils each as indicated in Fig. 32, which causes the operation to be the same as in Fig. 17a. Some one of these forms of tertiary circuit is essential in each of the Figs. 27 to 35, unless polyphase transformers are employed, as in Figs. 21 to 23 or 24 to 26.

The seven figures, 27, 28, 29, 30, 31, 33 and 34, show essentially how circuit-opening valves can be connected with respect to the direct-current circuit, this connection being independent of the grouping of the tertiary coils 61 to 66. In Fig. 27 all valves are connected in parallel with respect to the direct-current circuit, as was the case in Figs. 17a, 18a, 19a and 21 to 26. In Fig. 28 each valve is connected to a separate direct-current circuit, each of which requires its own shunting condenser. If the six direct-current circuits of Fig. 28 are connected in series to form a single direct-current circuit, Fig. 29 is obtained; if the direct-current circuits of Fig. 28 are connected three valves in parallel, two sets of valves in series, Fig. 30 is obtained; if they are connected two valves in parallel, three sets in series, Fig. 33 is obtained; if they are connected two valves in series, three sets in parallel, Fig. 31 is obtained; and finally if they are connected three valves in series, two sets in parallel, Fig. 34 is obtained.

Fig. 32 is a modification of Fig. 31 which dispenses with all but one of the shunting condensers. Likewise Fig. 35 is a modification of Fig. 34 which dispenses with all but one of the shunting condensers.

If the coils 71 to 76 of one alternating-current line are given the respective numbers of turns that were used in coils 31 to 36 of Figs. 8 to 16, and coils 81 to 86 are likewise given the respective numbers of turns of coils 41 to 46, then currents of the various valves will be equal and uniformly displaced in phase. With these proportions the voltages of the coils 71 to 76 (or of 81 to 86) will add up in such a way as to cancel out most of the harmonics, which therefore do not need to be absorbed by the impedance coil $L_z$ and the condenser $C_z$. The mathematical discussion for the combination of these voltages is exactly similar to that for the combination of currents in Figs. 8 to 16; so the harmonics of voltage which remain are only those whose orders are greater or less by one than a multiple of the number of valves, and their relative magnitudes are inversely as their orders.

This rule applies not only to the circuit-opening valve converters of Figs. 27 to 35, where tertiary currents are employed, but also to circuit-opening valve converters employing instead the structural features of Figs. 21 to 23 or of Figs. 24 to 26.

The presence of harmonics in the currents of the direct-current circuits of the valve converters of Figs. 17a to 35 comes under the rules given later in connection with the general circuit-opening valve converters, Figs. 48 to 53.

The alternating-current systems of Figs. 8 to 16, and of Figs. 27 to 35, may be any polyphase systems.

Fig. 36 shows a circuit-closing valve converter for changing an alternating current of one frequency to an alternating current of another frequency. In the example shown in this figure, one system is three-phase and the other four-phase. Each valve is associated with each system through two transformers which may have any desired ratio, but for which a ratio of one-to-one will be assumed for simplicity of discussion. Each valve therefore receives the voltage of each system, except for the voltage absorbed in series impedance. Series impedances are shown in the three-phase system for the purpose of absorbing the voltage differences between the two systems during the cyclic intervals when the respective valves are closed.

Shunt admittances are shown in the four-phase system for the purpose of absorbing the current differences during the cyclic intervals when the respective valves are open. The system having the series impedances may be referred to as the impedance side of the converter, while the system having the shunt admittances may be referred to as the admittance side. Each valve is closed for a fraction of a control cycle equal to the reciprocal of the number of phases in the admittance side; and the valves associated with each phase of the impedance side are closed at equally spaced instants, so that one and only one of these valves is closed at a time. Thus valves 1, 2, 3 and 4 are closed in succession, each for a quarter of a control cycle. The valves associated with each admittance phase also close at equally spaced instants, the fraction of a cycle between the closings of successive valves being the reciprocal of the number of phases in the impedance side. Thus valves 1, 101 and 201 are closed each one-third of a control cycle after the preceding. The closing of the various valves as just described is more clearly visualized by reference to Fig. 44, which shows the wave forms of current in the valves, as is explained more fully below. The effect of the control operation just described is to cause the sum of or the difference between the fundamental frequencies of the two systems to be equal to the control frequency. Harmonic frequencies are also produced but are absorbed by the impedances and admittances. Therefore the impedance coil $L_z$ and condenser $C_z$ are preferably made resonant to the fundamental frequency of the impedance side; and the admittance coil $L_y$ and condenser $C_y$ are preferably made resonant to the fundamental frequency of the admittance side.

Figs. 37–43 show various modifications of the circuit-closing valve frequency converter of Fig. 36. In all of these figures the valves are closed for the same intervals as in Fig. 36 and the frequency relations are the same throughout.

Fig. 37 shows a particularly desirable arrangement in that it eliminates all transformers and lends itself best to placing all of the valves in a single structure, this being the essential arrangement employed in the alternating-current valve converter of Fig. 54. This simplification of Fig. 36 is possible when the transformer ratios are all one-to-one; because as the circuit of each valve of Fig. 36 is isolated, the left-hand electrodes of all valves in each phase of the impedance side may be connected together and to the lines inside $L_z$ and $C_z$, and the right-hand electrodes of all valves in each phase of the admittance side may be connected together and to the lines. When this is done the junction of the transformer coils associated with each valve is at the same potential as both neutrals, and all transformer coils (except $L_y$) may be omitted.

Fig. 38 is derived from Fig. 36 by connecting together the left-hand electrodes of all valves and then replacing the transformer coils of each phase of the impedance side by a direct connection.

Fig. 39 is similarly derived from Fig. 36 by connecting together the right-hand electrodes of all valves and then replacing the transformer coils of each phase of the admittance side by a direct connection.

Figs. 40 and 41 show alternative methods for connecting in series all valves with respect to the impedance side.

Figs. 42 and 43 show alternative methods for connecting in series all valves of each phase with respect to the admittance side.

A circuit-closing valve converter in which the number of phases on the admittance side is not prime may be arranged so that the fraction of a cycle during which each valve is closed is equal to the reciprocal of the number of phases per group instead of the total number of phases on the admittance side. This is accomplished by assigning successive phases to successive groups cyclically. If the groups are to be connected in parallel with respect to the impedance side, each group is arranged as in Figs. 36 to 43 with separate series impedances. Examples are Fig. 4a with three groups and Fig. 5a with two groups, the impedance side here being direct-current. If the groups are to be connected in series, common series impedances may be employed. Examples are Fig. 13 with two groups and Fig. 16 with three groups. The valves are closed at the same cyclic intervals as if the same number of valves constituted a single group, but the durations of closing are longer (compare Figs. 4b and 5b with Fig. 6b).

Fig. 44 shows at the bottom the wave forms of current, for Figs. 36 to 43, on the impedance side, which is taken to have a frequency one-fifth that on the admittance side. Each of these three currents is broken up into four parts, one for each valve of the phase, as shown by the waves above, which are arranged on the figure to correspond with the arrangement of the valves on Figs. 36 to 43. The sum of the three currents for each of the admittance-side phases is shown at the right and constitutes the current of the admittance side inside the admittances.

Fig. 45 shows the wave forms of voltage for Figs. 36 to 43. At the right are the potentials of the lines on the admittance side. The twelve waves of valve voltage are obtained from these potentials by subtraction in accordance with the closings of the valves. The waves at the bottom are built up of arcs of the waves at the right and represent the potentials of the impedance side inside the impedances.

Figs. 46 and 47 correspond to Figs. 44 and 45 respectively, and differ only in that the frequency on the impedance side is now the higher, being five times that on the admittance side.

The waves of current inside the admittances (as shown at the right of Figs. 44 and 46) and the wave forms of potential inside the impedances (as shown at the bottoms of Figs. 45 and 47) contain fundamental sinusoids and certain higher frequencies which we may refer to as harmonics. They are strictly harmonics of a frequency corresponding to a complete cycle, at the end of which all voltage and current waves repeat. The mathematical theory showing which harmonics are present and their relative magnitudes is given below, with the following notation:

$p$, number of phases per group on admittance side (=4);
$r$, ordinal number in above, 1, 2, ... $p$;
$w$, number of groups (=1);
$u$, ordinal number in above, 1, 2, ... $w$;
$pw$, therefore, total number of phases on admittance side (=4×1);
$q$, number of phases on impedance side (=3);
$s$, ordinal number in above, 1, 2, ... $q$;
$\omega t$, angular time, in which a complete cycle is represented by $2\pi$;
$v$, number of control cycles per complete cycle;
$y$, number of cycles in admittance side per complete cycle;
$z$, number of cycles in impedance side per complete cycle;
$n$, order of harmonic of complete cycle;
$m$, $m'$, etc., any whole numbers, positive, negative or zero;
$\alpha$, phase angle of control operation;
$\beta$, phase angle of voltage on admittance side;
$\gamma$, phase angle of current on impedance side;
$E_m$, maximum potential to neutral, admittance side;
$I_m$, maximum current, impedance side.

Assuming sinusoidal voltages on the admittance side, the potential of the $r$ phase of the $u$ group is expressed as $$E_m \cos\left[y\omega t - \frac{2\pi(rw+u)}{pw} + \beta\right],$$

assuming the phase rotation to give lagging voltages in successive phases and groups. This potential is impressed on the $s$ phase of the impedance side during the time of closing of the ($r$, $u$, $s$) valve, or between the values of $\omega t$ $$\frac{1}{v}\left[\frac{2\pi(rw+u)}{pw} + \frac{2\pi s}{q} + \alpha\right]$$

and $$\frac{1}{v}\left[\frac{2\pi(rw+u)}{pw} + \frac{2\pi s}{q} + \alpha + \frac{2\pi}{p}\right],$$

assuming the control to operate successfully in valves of increasing $r$, $u$ and $s$. By Fourier's Theorem, the coefficient of the $n$th harmonic, expressed as a complex quantity, is then $$\frac{1}{\pi}\sum_{1}^{pv} r \int_{\frac{1}{v}\left[\frac{2\pi(rw+u)}{pw}+\frac{2\pi s}{q}+\alpha\right]}^{\frac{1}{v}\left[\frac{2\pi(rw+u)}{pw}+\frac{2\pi s}{q}+\alpha+\frac{2\pi}{p}\right]} E_m \cos\left[y\omega t - \frac{2\pi(rw+u)}{pw} + \beta\right] \epsilon^{jn\omega t} d\omega t =$$

$$\frac{E_m}{2\pi}\sum_{1}^{pv} r \left\{ \frac{\epsilon^{j\left[\frac{n+y}{v}\right]\left[\frac{2\pi(rw+u)}{pw}+\frac{2\pi s}{q}+\alpha+\frac{2\pi}{p}\right] - j\frac{2\pi(rw+u)}{pw}+j\beta} - \epsilon^{j\left[\frac{n+y}{v}\right]\left[\frac{2\pi(rw+u)}{pw}+\frac{2\pi s}{q}+\alpha\right] - j\frac{2\pi(rw+u)}{pw}+j\beta}}{j(n+y)} \right.$$

$$\left. + \frac{\epsilon^{j\left[\frac{n-y}{v}\right]\left[\frac{2\pi(rw+u)}{pw}+\frac{2\pi s}{q}+\alpha+\frac{2\pi}{p}\right] + j\frac{2\pi(rw+u)}{pw}-j\beta} - \epsilon^{j\left[\frac{n-y}{v}\right]\left[\frac{2\pi(rw+u)}{pw}+\frac{2\pi s}{q}+\alpha\right] + j\frac{2\pi(rw+u)}{pw}-j\beta}}{j(n-y)} \right\}$$

The terms in each of the four sums in the numerators are represented by unit vectors at equal angular differences, and form a closed polygon except when their angular difference is a multiple of $2\pi$. Thus the sum is zero except when $$\frac{n+y}{v} \cdot \frac{1}{p} - \frac{1}{p} = m,$$

a whole number, for the first two sums, or $$\frac{n-y}{v} \cdot \frac{1}{p} + \frac{1}{p} = m,$$

for the last two sums.

These cases may be expressed together as $$\frac{n \pm y}{v} = mp \pm 1 \quad \text{or} \quad n = mpv \pm (v-y).$$

In either of these cases the vectors are all at the same angle and give for the harmonic coefficient $$\frac{E_m}{2\pi} \cdot \frac{pv}{j(n\pm y)} \left\{ \epsilon j(mp\pm 1)\left(\frac{2\pi u}{pw}+\frac{2\pi s}{q}+\alpha+\frac{2\pi}{p}\right) \mp j\frac{2\pi u}{pw} \pm j\beta - \epsilon j(mp\pm 1)\left(\frac{2\pi u}{pw}+\frac{2\pi s}{q}+\alpha\right) \mp j\frac{2\pi u}{pw} \pm j\beta \right\}.$$

The two terms in the braces are represented by unit vectors differing in angle by $$(mp\pm 1)\frac{2\pi}{p}.$$

Their difference is represented by a vector at right angles ahead of their mean angle and having a length equal to twice the sine of half the angle between them. Hence the harmonic coefficient is $$\frac{|E_m p|}{\pi(mp\pm 1)} \sin \frac{\pi}{p}(mp\pm 1) \cdot \epsilon j(mp\pm 1)\left(\frac{2\pi u}{pw}+\frac{2\pi s}{q}+\alpha+\frac{\pi}{p}\right) \mp j\frac{2\pi u}{pw} \pm j\beta = \pm \frac{E_m p}{\pi(mp\pm 1)} \sin \frac{\pi}{p} \cdot \epsilon j(mp\pm 1)\left(\frac{2\pi s}{q}+\alpha\right) \pm j\frac{\pi}{p} + j\frac{2\pi m u}{w} \pm j\beta.$$

If the groups are connected in parallel, the impedances in the phases of each group absorb the voltage differences represented by the different values of $u$; while if the groups are connected in series, the voltages represented by the different values of $u$ add up. In either case the voltage appearing externally is canceled out except when $$\frac{m}{w}=m',$$

a whole number, or when $$\frac{n\pm y}{v}=m'pw\pm 1$$

or $$n=m'pwv\pm(v-y).$$

In this case the harmonic coefficient is $$\pm\frac{E_m p}{\pi(m'pw\pm 1)}\sin\frac{\pi}{p}\cdot\epsilon j(m'pw\pm 1)\left(\frac{2\pi s}{q}+\alpha\right)\pm j\frac{\pi}{p}\pm j\beta,$$

for parallel groups, and $w$ times as great for series groups. For certain relative values of $pw$ and $q$, further harmonics are canceled out in the voltages between lines, this being the case when $$\frac{m'pw\pm 1}{q}$$

is a whole number.

If the phase rotation of the control is reversed with respect to that of the voltage on the admittance side, the effect is essentially that of changing the algebraic sign of $v$ or $y$ in the above derivation. The expression for the magnitude of the harmonic is not changed, but in the equation for $n$ the expression $(v-y)$ is replaced by $(v+y)$.

The expression $(m'pw\pm 1)$ will be referred to for convenience as the order of the voltage harmonic, and by its form is evidently greater or less by one than a multiple of the number of phases on the admittance side.

The magnitude of the harmonic of potential inside the impedance, as shown by the last expression above, is inversely as the order of the harmonic.

The factor sin $$\frac{\pi}{p}$$

indicates that $p$ may be any positive whole number except 1 (for this would make the harmonic coefficient zero). If $pw$ is equal to 2, the system is single-phase on the admittance side; otherwise it is polyphase.

If the control frequency is equal to the frequency on the admittance side (that is, if $v=y$), direct voltages are produced on the impedance side. If the impedance side is then single-phase ($q=1$ or 2), the system is an ordinary direct-current system, two-wire (as in Figs. 4a, 5a and 6a) or Edison three-wire. On the other hand, if $q$ is then greater than 2, the impedance side constitutes what may be called a polyphase direct-current system—that is, a system in which the currents and voltages are constant from instant to instant but have values in the different phases corresponding to the values at a particular instant in an alternating-current polyphase system. Such polyphase direct currents would be practically useful, for example, for supplying the phase-wound rotor of an induction motor whose speed is to be brought up to or through synchronous speed. Of course, direct currents cannot be transformed, so that only Figs. 37 and 38 of the series 36 to 43 would be applicable, the condensers $C_z$ being omitted.

If the valve converters of Figs. 36 to 43 are polyphase alternating-current on the impedance side, certain voltage harmonics (produced in accordance with the mathematical theory above) may be canceled out externally to the values by appropriate transformer connections analogously to the methods employed in Figs. 27 to 35. That is, each transformer associated with the impedance side has a coil in series in each phase of the external circuit with such a number of turns as to make the currents of the $q$ phases equal in magnitude and with equal successive phase differences. To give this result, the number of turns in a coil associated with the $s$ phase is made proportional to $$\cos\left[\frac{2\pi s}{q}+\Theta\right],$$

where $\Theta$ has a different value for each phase of the external circuit. The total harmonic coefficient of voltage for each phase of the external circuit is then of the form $$\pm \sum_{1}^{q} s \cos\left[\frac{2\pi s}{q}+\Theta\right]\cdot\frac{E_m p}{\pi(m'pw\pm 1)}\sin\frac{\pi}{p}\cdot\epsilon j(m'pw\pm 1)\left(\frac{2\pi s}{q}+\alpha\right)\pm j\frac{\pi}{p}\pm j\beta=$$

$$\pm\frac{E_m p}{2\pi(m'pw\pm 1)}\sin\frac{\pi}{p}\sum_{1}^{q}s\left\{\epsilon j(m'pw\pm 1)\left(\frac{2\pi s}{q}+\alpha\right)\pm j\frac{\pi}{p}\pm j\beta+j\frac{2\pi s}{q}+j\Theta+\right.$$

$$\left.\epsilon j(m'pw\pm 1)\left(\frac{2\pi s}{q}+\alpha\right)\pm j\frac{\pi}{p}\pm j\beta-j\frac{2\pi s}{q}-j\Theta\right\}$$

As before, each sum is zero except when $$\frac{m'pw\pm 1}{q}+\frac{1}{q}=m'',$$

a whole number, for the first sum, or $$\frac{m'pw\pm 1}{q}-\frac{1}{q}=m'',$$

for the second sum. These cases may be expressed together as $$m'pw\pm 1 = m''q\mp 1,$$

the double signs being independent. In either of these cases, the above harmonic coefficient has the form $$\pm\frac{E_m pq}{2\pi(m'pw\pm 1)}\sin\frac{\pi}{p}\cdot\epsilon j(m'pw\pm 1)\alpha\pm j\frac{\pi}{p}\pm j\beta\pm j\Theta,$$

where the sign of $(\pm j\Theta)$ is taken to correspond with that in the expression $$(m''q\mp 1).$$

Thus all harmonics of voltage will be absent from the external circuit on the impedance side except those whose orders are greater or less by one than a multiple of the number of phases, both on the impedance side and on the admittance side.

Using the above notation, the mathematical discussion of the components of current existing on the admittance side inside of the admittances is as follows:

Assuming sinusoidal currents on the impedance side, the current of the $s$ phase is expressed as $$I_m\cos\left(z\omega t-\frac{2\pi s}{q}+\gamma\right).$$

If the groups are connected in parallel, the $1/w$ part of this current flows to the $r$ phase of the $u$ group during the time of closing of the $(r, u, s)$ valve, as given above. The coefficient of the $n$th harmonic of the $(r, u)$ current is then $$\frac{1}{\pi}\sum_{1}^{qv}s\int_{\frac{1}{v}\left[\frac{2\pi(rw+u)}{pw}+\frac{2\pi s}{q}+\alpha\right]}^{\frac{1}{v}\left[\frac{2\pi(rw+u)}{pw}+\frac{2\pi s}{q}+\alpha+\frac{2\pi}{p}\right]}\frac{I_m}{w}\cos\left(z\omega t-\frac{2\pi s}{q}+\gamma\right)\epsilon^{jn\omega t}d\omega t=\frac{I_m}{2\pi w}\sum_{1}^{qv}s$$

$$\left\{\frac{\epsilon j\left[\frac{n+z}{v}\right]\left[\frac{2\pi(rw+u)}{pw}+\frac{2\pi s}{q}+\alpha+\frac{2\pi}{p}\right]-j\frac{2\pi s}{q}+i\gamma-\epsilon j\left[\frac{n+z}{v}\right]\left[\frac{2\pi(rw+u)}{pw}+\frac{2\pi s}{q}+\alpha\right]-j\frac{2\pi s}{q}+i\gamma}{j(n+z)}+\right.$$

$$\left.\frac{\epsilon j\left[\frac{n-z}{v}\right]\left[\frac{2\pi(rw+u)}{pw}+\frac{2\pi s}{q}+\alpha+\frac{2\pi}{p}\right]+j\frac{2\pi s}{q}-i\gamma-\epsilon j\left[\frac{n-z}{v}\right]\left[\frac{2\pi(rw+u)}{pw}+\frac{2\pi s}{q}+\alpha\right]+j\frac{2\pi s}{q}-j\gamma}{j(n-z)}\right\}.$$

As with the voltages, these sums are zero except when $$\frac{n \pm z}{v} = m''q \pm 1 \text{ or } n = m''qv \pm (v-z),$$

in which case the harmonic coefficient is $$\frac{I_m}{2\pi w} \cdot \frac{qv}{j(n \pm z)} \left\{ \epsilon^{j[m''q \pm 1]\left[\frac{2\pi(rw+u)}{pw} + \alpha + \frac{2\pi}{p}\right] \pm j\gamma} - \epsilon^{j[m''q \pm 1]\left[\frac{2\pi(rw+u)}{pw} + \alpha\right] \pm j\gamma} \right\} =$$

$$\frac{I_m q}{\pi w(m''q \pm 1)} \sin \frac{\pi}{p}(m''q \pm 1) \cdot \epsilon^{j[m''q \pm 1]\left[\frac{2\pi(rw+u)}{pw} + \alpha + \frac{\pi}{p}\right] \pm j\gamma}.$$

If the groups are connected in series, the harmonic coefficient is $w$ times this value.

If the phase rotation of the control is reversed with respect to that of the currents on the impedance side, the magnitudes of the harmonics are not changed, but in the equation for $n$ the expression $(v-z)$ is replaced by $(v+z)$.

The expression $(m''q+1)$ will be referred to as the order of the current harmonic, and by its form is evidently greater or less by one than a multiple of the number of phases on the impedance side. The magnitude of the harmonic of current inside the admittances, as shown by the last expression above, is inversely as the order of the harmonic.

If the control frequency is equal to the frequency on the impedance side, (that is, if $v=z$), direct currents are produced on the admittance side. If the admittance side is then single-phase ($pw=2$), the system is an ordinary direct-current system.

In the use of impedances and admittances to absorb voltages and currents of undesired frequencies, it is practically necessary that these frequencies differ considerably from the desired frequency. If, in the above expression for $n$ for current harmonics, the frequency of the impedance side is very low but not zero, and if $q=1$, the system then being low-frequency single-phase, two nearly equal values for $n$ occur, that corresponding to $m''=0$ and that corresponding to $m''=2$, these values being respectively $(v-z)$ and $(v+z)$. Again, in this expression for $n$, if $q=2$ instead of 1, which also is a single-phase system, there are the same two nearly equal values for $n$, corresponding to $m''=0$ and $m''=1$. Similar remarks apply to the expression for $n$ in the voltage harmonics of the impedance side, in the case when the frequency $y$ of the admittance side is very low and $pw=2$. Thus the valve converters here discussed are not suited to conversions involving low-frequency single-phase systems, low-frequency being taken relative to the control frequency. Such conversions will form the subject matter of an application for Letters Patent about to be filed.

Certain current harmonics produced in the valve converters of Figs. 36 to 43 (in accordance with the mathematical theory above) may be canceled out externally to the valves by appropriate transformer connections analogously to the methods employed in Figs. 8 to 16. That is, there are added on the admittance side two or more transformers connected to suit the desired external polyphase system; and each transformer has a coil in series with each of the $pw$ phases of the valve converter on the admittance side, with such a number of turns as to make the voltages of the $pw$ phases equal in magnitude and with equal successive phase differences. To give this result, the number of turns in a coil associated with the $r$ valves of the $u$ group is made proportional to $$\cos\left[\frac{2\pi(rw+u)}{pw} + \Theta'\right],$$

where $\Theta'$ has a different value for each transformer. The harmonic coefficient of the total current-turns for one transformer then has the form $$\sum_{1}^{pw} rw+u \cos\left[\frac{2\pi(rw+u)}{pw} + \Theta\right] \cdot \frac{I_m q}{\pi w(m''q \pm 1)} \sin \frac{\pi}{p}(m''q \pm 1) \cdot \epsilon^{j[m''q \pm 1]\left[\frac{2\pi(rw+u)}{pw} + \alpha + \frac{\pi}{p}\right]} \mp$$

$$j\gamma = \frac{I_m q}{2\pi w(m''q \pm 1)} \sin \frac{\pi}{p}(m''q \pm 1) \sum_{1}^{pw} rw+u \left\{ \epsilon^{j[m''q \pm 1]\left[\frac{2\pi(rw+u)}{pw} + \alpha + \frac{\pi}{p}\right] \pm} \right.$$

$$\left. j\gamma + j\frac{2\pi(rw+u)}{pw} + j\Theta' + \epsilon^{j[m''q \pm 1]\left[\frac{2\pi(rw+u)}{pw} + \alpha + \frac{\pi}{p}\right] \pm j\gamma - j\frac{2\pi(rw+u)}{pw} - j\Theta'} \right\}$$

As before, each sum is zero except when $$\frac{m''q \pm 1}{pw} + \frac{1}{pw} = m',$$

a whole number, for the first sum, or $$\frac{m''q \pm 1}{pw} - \frac{1}{pw} = m',$$

for the second sum. These cases may be expressed together as $$m''q \pm 1 = m'pw \mp 1,$$

the double signs being independent. In either of these cases the above harmonic coefficient has the form $$\pm \frac{I_m pq}{2\pi(m''pw \mp 1)} \sin \frac{\pi}{p} \epsilon^{j(m'pw \mp 1)\alpha \pm j\frac{\pi}{p} \pm j\gamma \pm j\theta'},$$

where the signs of the whole expression $$\left(\pm \frac{j\pi}{p}\right)$$

and ($\pm j\gamma$) are taken to correspond with that in the expression ($m''q \pm 1$). This total value of current-turns must be magnetically balanced by the alternating current of the transformer coil connected in the external circuit. Therefore all harmonics of current will be absent from the external circuit on the admittance side, except those whose orders are greater or less by one than a multiple of the number of phases, both on the impedance side and on the admittance side.

As with direct-current valve converters, valve frequency converters are divided into two classes; circuit-closing, in which each valve is closed for a fraction of the control cycle equal to the reciprocal of the number of phases per group on the admittance side, as illustrated in Figs. 36 to 43; and circuit-opening, in which each valve is opened for a fraction of the control cycle equal to the reciprocal of the number of phases per group on the impedance side, as illustrated in Figs. 48 to 53, which will now be discussed. There is no essential distinction between circuit-closing and circuit-opening in cases where the intervals of closing are each one half of a cycle.

Figure 48:
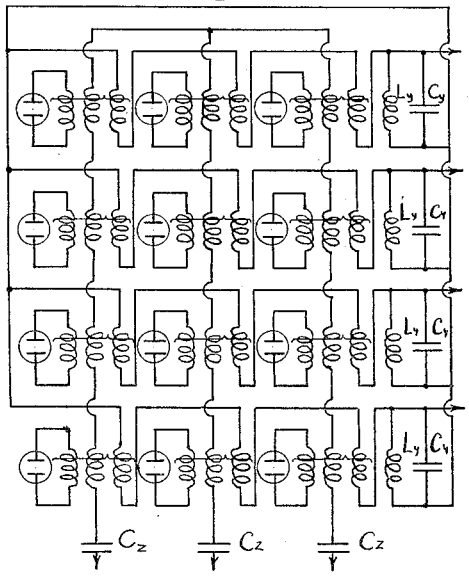

Fig. 48 shows a circuit-opening valve converter for changing an alternating current of one frequency to an alternating current of another frequency. The example illustrated, as in Figs. 36 to 43, has a three-phase system on the impedance side and a four-phase system on the admittance side. Each valve is associated with each system through two transformers which may have any desired ratio but for which a ratio of one-to-one will be assumed for simplicity of discussion. Each valve therefore receives the current of each system, except for the current absorbed in shunt admittance. The valves in each phase of the impedance side open successively at instants separated by the fraction of a cycle equal to the reciprocal of the number of phases on the admittance side; the valves in each phase of the admittance side open successively at instants separated by the fraction of a cycle equal to the reciprocal of the number of phases on the impedance side. The duration of opening of each valve is the fraction of a cycle equal to the reciprocal of the number of phases on the impedance side, there being only a single group. The relation between the frequencies of the two sides and of the control frequency is the same as in Figs. 36 to 43.

Figure 49:
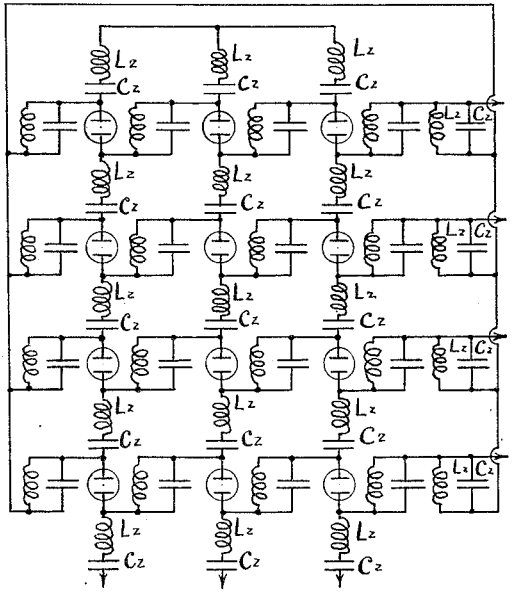
Figure 50:
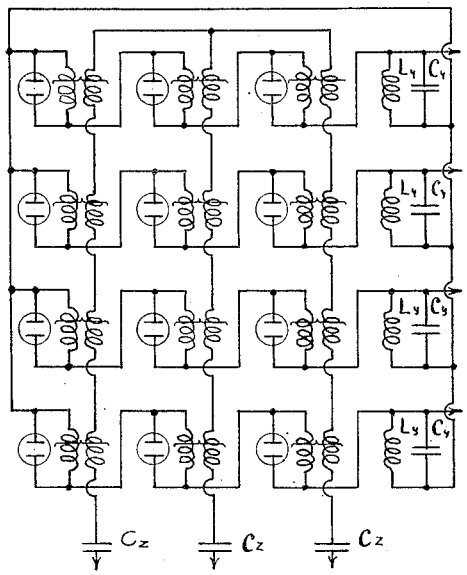
Figure 52:
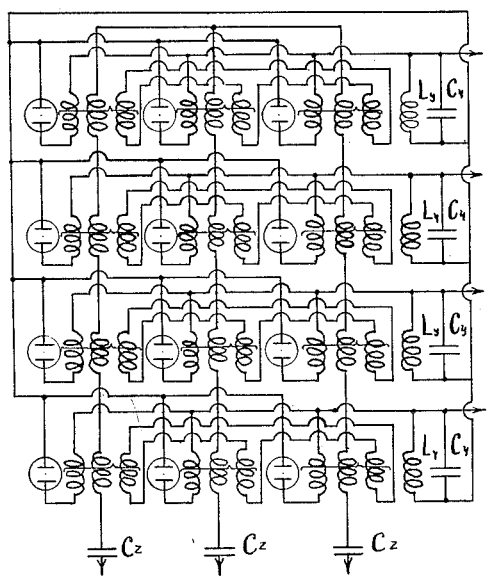
Figure 53:
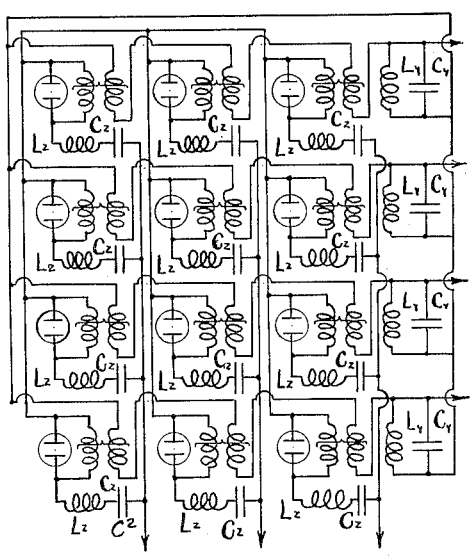

Figs. 49 and 53 show various modifications of the circuit-opening valve frequency converter of Fig. 48. In all of these figures the valves are opened for the same intervals as in Fig. 48 and the frequency relations are the same throughout. In Figs. 48, 50 and 52 the impedance necessary to absorb voltage differences is made up of the leakage reactances of the transformers in series with the condensers $C_s$.

Fig. 49 is a modification which omits all transformers, the valves being directly connected in series with respect to each system through arrangements of resonant circuits.

Figure 51:
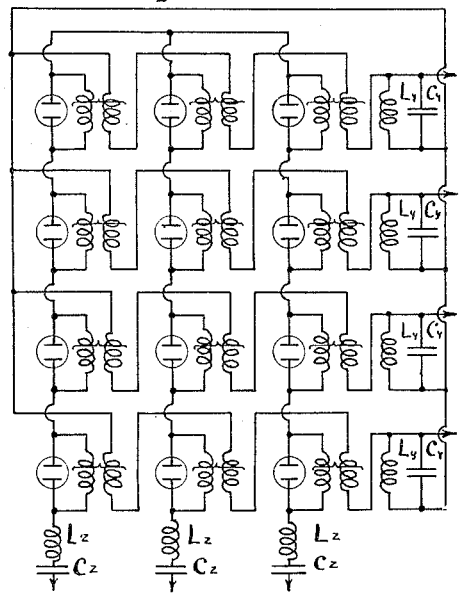

Fig. 50 shows the valves connected in series directly in the circuit of the admittance side, but connected to the impedance side through transformers. Conversely, Fig. 51 shows the valves connected in series directly with respect to the impedance side, but through transformers with respect to the admittance side. Fig. 52 shows the valves connected in parallel with respect to the admittance side, which requires the use of tertiary circuits, as in Figs. 17a, 18a and 19a. Fig. 53, on the other hand, shows the valves connected in parallel with respect to the impedance side, which requires separate series impedances as shown.

As with the circuit-closing valve converters of Figs. 36 to 43, the circuit-opening valve converters of Figs. 48 to 53 may be arranged with the valves in several groups. This requires that the number of phases on the impedance side be not prime and is accomplished by connecting the successive phases on the impedance side cyclically to successive groups. If the groups are to be connected in series with respect to the admittance side each is arranged with separate shunt admittances. Examples are Fig. 30, with the tertiary circuits arranged as in Fig. 35 and thence with two groups, and Fig. 33 with the tertiary circuits arranged as in Fig. 32 and thence with three groups, the admittance side here being direct-current. If the groups are to be connected in parallel with respect to the admittance side, common shunt admittances may be employed. Examples are Fig. 17a with three groups and Fig. 18a with two groups. The valves are opened at the same cyclic intervals as if the same number of valves constituted a single group, but the durations of opening are longer and correspond with the number of phases per group instead of the total number of phases on the impedance side. (Compare Figs. 17a and 18a wih Fig. 19a.)

The wave forms of voltage and current for Fig. 48 are similar to those of Figs. 44 and 45 or to those of Figs. 46 and 47, with interchanges between voltage and current and between admittance side and impedance side (therefore requiring changes in detail to conform with the interchange of three-phase and four-phase). Certain harmonics in the voltages on the impedance side and in the currents on the admittance side may be canceled out externally to the valves by the same transformer arrangements as are applicable to the same sides of circuit-closing valve converters. The theory and the orders of the harmonics that may be canceled out are the same as given for circuit-closing valve converters.

In Figs. 36 to 43 and 48 to 53, the external circuits of the valve converters have been shown for simplicity as star-connected, directly or effectively. It is sometimes convenient to employ other polyphase connections, particularly the ring connection (delta connection for three-phase) which facilitates putting the valves in a single structure with both sides of the electrodes active, as exemplified by the alternating-current valve converter 313 of Fig. 55.

Fig. 54 shows a specific application of the general valve converter circuits discussed above. Direct-current power is received from a trolley 300, is converted into alternating-current power of moderately high frequency in the direct-current valve system 301 and associated transformer 302, is then converted into polyphase alternating current of low variable frequency in the alternating valve system 303, and is finally supplied over lines 304 to squirrel-cage induction motors 305. The moderately high frequency in the intermediate circuit should be considerably higher than the low frequency of the output circuit and will ordinarily be of the order of a few hundred or a few thousand cycles per second. The direct trolley voltage is taken to be high, say 10,000 volts for economical transmission. The direct-current valve system 301 is therefore arranged with several valves (four) in series to divide up this voltage. This valve converter is of the double six-phase type in which the valves 1 and 1' operate simultaneously, 2 and 2', etc., each being open for half a cycle. The current and voltage wave forms are like those of Fig. 17b, except that, the power factor not generally being unity, the current waves consist of other arcs of sinusoids. Third harmonic voltages exist between the two primary deltas, but not in the individual coils. The output 304 of the alternating-current valve converter is the admittance side; the input, the impedance side. The transformer 302 is preferably designed with sufficient leakage reactance to serve as the required series impedance for both the direct-current and the alternating-current valve converters. Further, this leakage reactance is preferably made such as to limit the current to a safe value when the motors are at standstill at very low frequency (and so act practically as short circuits) and when full voltage is supplied from the trolley. The value of impedance so required to limit the current will usually be sufficient to satisfactorily absorb the voltage harmonics; if not, the leakage reactance of the transformers can be made still larger and series condensers may be inserted to give the desired current under starting conditions.

The shunt condensers $C_y$ on the direct-current admittance side should be made as large as considerations of economy permit, in order that the current harmonics which reach the trolley wire can be kept low enough not to interfere with parallel telephone lines. The shunt condensers $C'_y$ on the output side are less important for limiting current harmonics and may advantageously be chosen so as to supply the exciting current of the induction motors, say at light load and normal frequency.

The alternating-current valve system 303 is of the circuit-closing six-phase type with the valves so grouped that each is closed for one-third of a control cycle. The diametrical connection of the secondary coils of transformer 302 serves to cancel out some of the voltage harmonics that are developed between certain electrodes on the impedance side of the valve system.

Fig. 55 differs from Fig. 54 only in the structure of the alternating-current valve 313 and in the transformer connections 312 which correspond. This valve structure is here arranged so that each valve is open for one-half of a control cycle.

Fig. 56 shows how the direct-current valve converters of Figs. 54 and 55 may be externally re-connected for operation on half voltage, as 5,000 volts. The control for the lower six valves must be reversed in phase, relative to that in Figs. 54 and 55.

Fig. 57a gives the control connections for the direct-current valve converter of Fig. 54; and Fig. 57b gives the control connections for the alternating-current valve converter of the same figure. The valve structures 301 and 303 are of the magnetically guided, electrostatically controlled, thermionic type (a structure of which is shown in Figs. 58a, 58b and 59), each valve having a separate grid represented in the conventional way. To give the rapid variation in grid potential required for highly efficient valve operation, it is necessary to supply large momentary currents to the electrostatic capacities of the grids. This is accomplished by suddenly charging the grids from the reservoir condenser $C'_r$ or $C''_r$ through a control valve 401 or 403, the grid of which is controlled by a commutator, 411 or 413.

In order that the same control valve may be used successively for all grids, a selector commutator 421 or 423 is employed.

Considering Fig. 57a in detail, the selector commutator 421 has four conducting segments, the two shorter of which are connected through slip-rings across the reservoir condenser $C'_r$ when the control valve 401 closes. The two longer segments are connected through slip-rings to a rectifier 431 which maintains one positive, the other negative, with respect to the neutral point $N'$ of the direct-current valve converter. The grid of the control valve 401 is maintained negative by the negative small valve rectifier 441 except when the circuit is closed at the control commutator 411, when the grid is made positive by the positive small rectifier 451. When the grid is negative, of course the control valve 401 is open and when the grid is positive the valve is closed. Now consider the action with respect to the grids $G_4$ and $G'_4$ beginning at the instant shown in the figure. The control valve has just been closed by the closing of the circuit at the control commutator 411. The brush 464 at the right of the selector commutator 421 then connects the grids $G_4$ and $G'_4$ to the positive side of condenser $C'_r$ through the control valve 401. At the same time the brush 461 at the left of the selector commutator connects the grids $G_1$ and $G'_1$ (each through a biasing rectifier $B_1$ and $B'_1$) to the negative side of $C'_r$. This action took place suddenly when the control valve was closed and a relatively large current momentarily was supplied by the reservoir condenser $C'_r$ to charge the capacity of $G_4$ and $G'_4$ in series with the capacity of $G_1$ and $G'_1$. As the commutators rotate in a counter-clockwise direction the brush 464 spans over the insulation between the short segment and the long segment marked "+". At the same time the brush 461 connects the other short segment momentarily to the long segment marked "−". The control valve 401 being still closed, the reservoir condenser $C'_r$ is thus connected across rectifier 431 and is recharged. Shortly thereafter the contact on the control commutator 411 is broken and the control valve then opens, leaving the condenser $C'_r$ charged and an open circuit, ready for charging the next set of grids $G_5$, $G'_5$, $G_2$, $G'_2$. For nearly half a revolution the grids $G_4$ and $G'_4$ are directly connected through the "+" segment to the positive terminal of the rectifier 431, and the grids $G_1$ and $G'_1$, in series with $B_1$ and $B'_1$ respectively, are directly connected through the "−" segment to the negative terminal of 431. When the brushes 464 and 461 leave the long segments, the short segments are temporarily isolated because the control valve 401 is then open; the grids, being insulated, retain their charge and their potential for a short time. Control valve 401 is then closed (by having its grid made positive through another contact on 411) and a current is suddenly supplied by $C'_r$ to reverse the potentials of the grids.

As the system is six-phase there are six valve operations per cycle, requiring six equally spaced contacts on the control commutator 411 and six equally spaced brushes on the selector commutator 421, the commutators being directly connected mechanically, as indicated by the dotted line. Of course the commutators may be constructed to operate at one-half or one-third of the speed by multiplying their contacts by two or three, respectively.

The potentials of the evenly numbered grids are required to be positive or negative with respect to the central main electrode, which forms the neutral point $N'$ of the direct-current system; and this result is attained as described above by having $N'$ connected to the neutral point of the rectifier 431. On the other hand, the potentials of the grids $G_1$, $G_3$ and $G_5$ are required to be positive or negative with respect to the upper (positive) electrode; so these grids each require a positive bias with respect to the neutral point, this bias being obtained through the rectifiers $B_1$, $B_3$ and $B_5$. Similarly the grids $G'_1$, $G'_3$ and $G'_5$ are given a negative bias by means of the rectifiers $B'_1$, $B'_3$ and $B'_5$.

The rectifiers 431, 441, 451 and the B's of Fig. 57a, as well as 433, 443 and 453 of Fig. 57b, have emissive cathodes and non-emissive anodes. The grids are constantly positive with respect to the anodes and alternately positive and negative with respect to the cathodes. All of these rectifiers are supposed to be supplied with voltages of rectangular wave form such as may be obtained from one of the direct-current valves. The rectifiers 441, 451, 443, 453 and the B's take care of such small powers that they are best made single; while each part of the rectifiers 431 and 433 takes care of larger powers and is made double. The coils connected to the B rectifiers may be secondaries of the same transformers which supply other rectifiers. The control valve circuits $C'_r$, 401, 411, 441 and 451, and the bias circuits $B_1$, $B_3$, etc. should be arranged with low capacity to ground, as their potentials are required to change suddenly.

Considering Fig. 57b in detail, selector commutator 423 is arranged similarly to that of Fig. 57a except that the "+" segment covers a little less than one third of a circumference and the "−" segment covers a little less than two-thirds. The result is that the grids of the alternating-current valve system 303 are positive for one-third and negative for two-thirds of a cycle. As the neutral point $N''$ of the output circuit is connected to the neutral point of the rectifier 433, and as the potentials of the grids are required to be positive or negative with respect to the output electrodes (connected to the lines 304), there is inserted in series with each grid the secondary of a one-to-one transformer whose primary is connected between N″ and the corresponding output electrode. These transformers cause the potentials of the grids to follow the potentials of the corresponding output electrodes. Except for the differences just described, the operation of the control system in Fig. 57b is like that in Fig. 57a.

The frequency of the intermediate circuit (302, etc.) of Fig. 54 or Fig. 55 is the control frequency of the direct-current valve converter. The output frequency is the difference between this frequency and the control frequency of the alternating-current valve converter of Fig. 57b. The output frequency is therefore equal to the difference in speed between the direct-current control commutators (411 and 421) and the alternating-current control commutators (413 and 423), or to a multiple of this speed in case the number of segments of these commutators has been multiplied. In place of having the commutators operate at different speeds, they are preferably mechanically connected to operate at the same speed, and one set of control brushes (461—466 or 471—476) is revolved at a speed corresponding to the desired output frequency. In other words, the valve structure 303 operates as a combined modulator and rectifier, its control grids being excited by the commutator 423 at a relatively high frequency of the same order of magnitude as that at which the grids of the valve structure 301 are excited. In this way there is produced in the valve structure 303 two beat frequencies equal respectively to the sum and difference of the control frequencies of the valve structures 301 and 303. One of these beat frequencies (preferably the difference frequency) is rectified in the valve structure 303 and appears as low frequency alternating current in the output circuit 304. Such an arrangement enables the frequency of the alternating current circuit 304, and hence the speed of the induction motor 305, to be controlled readily, a feature which is disclosed and broadly claimed in United States Letters Patent No. 1,702,402, granted to me February 19, 1929, upon a division of the present application.

In case such a cascade valve converter were to be used to supply synchronous motors, the output frequency would be the rotational frequency of these motors and would therefore directly determined their speed. This speed would be controlled by the speed of a pilot motor driving one set of control brushes. However, the squirrel-cage induction motors, which have been chosen as best suited for electric traction purposes, run at a speed less than synchronous speed by the slip. If the relative speed at the control commutators is not allowed to vary with the load on the motors, the latter will have speed-torque characteristics similar to direct-current shunt motors with field control or armature voltage control; and speeds will be set approximately by the speed setting of the commutators, but will drop off slightly as load is added. On the other hand, if one set of control brushes as 461—466 (of course with the brush on 411), is driven positively by the rotor of an induction motor, the speed being stepped up in a ratio equal to the number of pairs of poles (for the number of segments shown in the figure), and the other set of brushes instead of being stationary is allowed to revolve slowly, then the speed-torque characteristics will be similar to those of a direct-current series motor. The theory of this case is given in the following paragraphs:

For simplicity of discussion suppose the motor to be bipolar and the commutators bipolar also (as in Figs. 57a and 57b, where corresponding segments are not repeated). Let us use the following notation:

$n$, motor speed, or the speed of the direct-current control brushes, 461—466;

$n_s$, motor slip speed;

$n_b$, speed of alternating-current control brushes, 471—476;

$n_c$, speed of control commutators 411, 421, 413, 423;

E, motor voltage;
I, motor current;
$\phi$, motor flux;
$r$, resistance of main circuit;
D, motor torque;
$k$, $k'$, etc., constants.

Then the intermediate frequency is equal to $(n_c-n)$; the alternating-current control frequency is $(n_c-n_b)$; and the output frequency is $(n-n_b)$, which is equal to the synchronous speed. Hence the slip is $$n_s = (n-n_b) - n = -n_b.$$

That is, the motor slip is numerically equal to the speed of the alternating-current control brushes, and is therefore capable of independent control.

Now approximately the following relations obtain:

$$E = k\phi(n+n_s) + Ir; \quad I = k'\phi n_s$$

and $$D = k''I\phi.$$

Hence $$E = \frac{k_1 I(n+n_s)}{n_s} + Ir$$

and $$D = \frac{k_2 I^2}{n_s}.$$

Finally $$D = k_2 n_s \left(\frac{E}{k_1 n + k_1 n_s + r n_s}\right)^2.$$

Comparing a direct-current series motor, $$E = kn\phi + Ir; \quad I = k'''\phi$$

and $$D = k''I\phi.$$

Hence $$E = k_3 nI + Ir$$

and $$D = k_4 I^2.$$

Finally $$D = k_4 \left(\frac{E}{k_3 n + r}\right)^2.$$

With $n_s$ constant above, the two equations are of the same form, showing the induction motor controlled as above to have characteristics like the direct-current series motor.

The ordinary direct-current motor is properly described as a synchronously commutated synchronous motor, or simply a direct-current synchronous motor. The induction motors controlled as above are correspondingly described as non-synchronously commutated induction motors, or simply direct-current induction motors. A more elementary form of direct-current induction motor would be one having an ordinary commutated armature and a field structure equipped with a squirrel-cage winding instead of a direct-current field winding. If the brushes were then slowly revolved, a magnetic flux would be produced which would also slowly revolve and would induce currents in the squirrel-cage, as in an ordinary induction motor. The arrangement of this invention accomplishes essentially this result in a more elaborate but more satisfactory way.

The control commutators of Figs. 57a and 57b may be mounted in a chamber of compressed gas, to allow proper insulation with reduced clearances, thus permitting moderate peripheral speeds.

The direct-current valve system 301 and the alternating-current valve system 303 of Fig. 54 are shown combined in a single structure in Figs. 58a and 58b. Each valve system consists of a metal vessel 501 and 503 in which a very high vacuum is maintained, preferably by a continuously operating high-vacuum pump. Inside of these vessels are reflectors consisting of concentric metal shells 500, preferably polished, for the purpose of retaining the heat developed by the losses in the valves and so maintaining the main electrodes 504 at the proper temperature for electron emission. Within the reflectors are the valves proper, a detail of which is shown in Fig. 59. The main electrodes are flat metal plates, while the control electrodes are grids made up of metal tubes 505. The main electrodes are given an emissive coating, such as calcium oxide, over the portions 506 in the central space between grid conductors. Both of the main electrodes are thus made emissive so that current can flow in either direction. The valve systems are placed in a constant magnetic field produced by the iron core 507 excited by the coils 508, 509, 510, the lines of magnetic flux having the paths indicated by the dotted lines. The coils are excited by direct current and produce an intense magnetic field in the space occupied by the valve systems, say a magnetic intensity of the order of 1,000 ampere-turns per centimeter. During a portion of each control cycle the grid of each valve is made highly positive in potential (say 10,000 volts) with respect to the two main electrodes, as described in connection with Figs. 57a and 57b. Electrons then are attracted from the cathode and are rapidly accelerated to high velocity. They are guided by the magnetic field, tending to move along the lines of magnetic flux, but with a rotary component of motion and a drift parallel to the grid conductors. With the intense magnetic field their rotary motion does not carry them far enough out of the direct path to reach the grid conductors. They therefore continue their motion after they pass the neighborhood of the grid conductors and are then retarded so that they strike the anode with a low velocity corresponding say to a voltage of the order of 10 volts, which is then the voltage drop of the valve. The space distribution of electrons is determined by the potential of the grid; while the net rate at which electrons proceed from the cathode to the anode is determined by the load on the valve. It is necessary that the load on the valve shall never be so high that all of the electrons are traveling toward the anode, for any increase in load could not then be supplied by increased current, and would cause the load voltage to drop off, the valve being required to absorb the difference in voltage and thereby being overheated. Thus some of the electrons which happen to have slightly lower longitudinal velocities will not quite reach the anode and will return toward the cathode, oscillating back and forth throughout the interval when the valve is closed. The two oppositely moving streams of electrons will experience certain collisions with one another and with residual molecules of gas. The collisions between electrons will not be serious if the duration of the current is short—that is, if the control frequency is moderately high, say of the order of 1,000 cycles per second. The presence of gas molecules is minimized by the use of the highest possible vacuum.

The valve is opened by making the grid highly negative in potential (say a few thousand volts) with respect to both main electrodes, by the methods described in connection with Figs. 57a and 57b. The electrons are then very quickly drawn to the main electrodes, including those electrons which have suffered collision and which therefore have lost so much longitudinal velocity that they were unable to reach either main electrode during the interval when the valve was closed.

It is essential that the grid conductors and the main electrodes opposite the grid conductors should have a surface, say of uncoated tungsten, which gives relatively very little electron emission at the operating temperature.

The temperature of the electrodes is largely self-regulating, and is that which maintains the electron current near its saturation value. For if the load should increase, the voltage drop in the valve would temporarily increase, as described above, which would accelerate the electrons and heat up the anodes, which in turn would reflect the heat to the cathodes. This action would continue until the cathodes again reached the temperature required for the new emission.

As the valve system described has low inherent losses, it is preferable to conserve the heat by limiting its radiation, by the use of reflectors as described above, and by limiting its conduction through the leads, which therefore are made long enough and of small enough cross-section so that the heat conducted through them at the seals is approximately equal to the heat developed in their resistances.

The electrodes and reflectors of the valve systems are supported by electrical insulators which are proportioned so as to be fairly good heat insulators. The grid leads are shown as brought out through seals 511 at the top of the valve structures, and the leads of the main electrodes at the bottom, for convenience. The whole structure of Figs. 58a and 58b is preferably immersed in a tank filled with oil which serves to insulate the leads and whose circulation conducts the heat away and keeps the coils at a suitably low temperature. A ventilating hole 513 is shown in the center of the iron core to facilitate the upward flow of the oil. To start the operation of the valve converter it is necessary to supply heat from a separate source. This is preferably done by passing current through a resistor inside each valve system, the inside heat reflector being available for this purpose. Otherwise an alternating current may be passed through the coils 508 and will produce an alternating magnetic flux which will induce eddy currents in the electrodes and will so heat them. If this latter method is adopted, it will of course be preferable to laminate the iron core 507.

With the moderately high frequency of the intermediate circuit the transformer 302 will naturally have a rather high reactance and will tend to have a high eddy-current loss, both in the iron core and in the copper winding. Thin laminations and a relatively low flux density are therefore desirable in the core. As the frequency is high, the number of turns required in the coils is relatively low; and the coil is preferably made of thin sheet copper wound spirally outward, the primary and secondary coils being one inside the other, so spaced (or interleaved, if necessary) as to give the desired reactance. As the secondary voltage is the lower, particularly at heavy loads, it is preferable to place the secondary coil next to the iron core, so as to reduce the flux in the core and therefore the core loss.

I claim:

1. A cascade electrical converter comprising a plurality of electrostatically controlled valves which convert electric power of a given form into high-frequency power and a second plurality of electrostatically controlled valves which convert the high-frequency power into polyphase low-frequency power.

2. Apparatus for converting electric energy of a given form into low frequency alternating current comprising means including a plurality of electric valves for converting said energy into high frequency alternating current, and means including a plurality of other electric valves for convertnig said high frequency alternating current into low frequency alternating current.

3. Apparatus for converting electric energy of a given form into low frequency alternating current comprising means including a plurality of electric valves for converting said energy into high frequency alternating current, means including a plurality of other electric valves for convertnig said high frequency alternating current into low frequency alternating current, and means for varying the frequency of said low frequency current.

4. Apparatus for converting electric energy of a given form into low frequency alternating current comprising means including a plurality of electric valves for converting said energy into high frequency alternating current, means including a plurality of other electric valves for converting said high frequency alternating current into low frequency alternating current, and an inductive reactance included in said first converting means for limiting the low frequency current occasioned by a short circuit on the low frequency circuit.

5. Apparatus for converting electric energy of a given form into low frequency alternating current comprising means including an inductive winding and a plurality of electric valves for converting said energy into high frequency alternating current, and means including a plurality of other electric valves for converting said high frequency alternating current into low frequency alternating current, said inductive winding being provided with substantial leakage reactance for limiting the low frequency short circuit current.

6. A cascade electrical converter comprising a plurality of electrostatically controlled valves which convert direct-current power into high-frequency power, a second plurality of electrostatically controlled valves which convert the high-frequency power into polyphase low-frequency power, shunt admittance in the direct-current circuit absorbing differences between the direct current and the high-frequency currents, shunt admittance in the low-frequency circuit absorbing differences between the low-frequency currents and the high-frequency currents, and series impedance in the high-frequency circuit absorbing differences between the direct voltage and the high-frequency voltages and between the high-frequency voltages and the low-frequency voltages.

7. A cascade electrical converter comprising a plurality of electrostatically controlled valves which convert direct-current power into high-frequency power, a second plurality of electrostatically controlled valves which convert the high-frequency power into polyphase low-frequency power, shunt capacity in the direct-current circuit absorbing reactively differences between the direct current and the high-frequency currents, shunt capacity in the low-frequency circuit absorbing reactively differences between the low-frequency currents and the high-frequency currents, and series inductance in the high-frequency circuit absorbing reactively differences between the direct voltage and the high-frequency voltages and between the high-frequency voltages and the low-frequency voltages.

8. The method of converting direct-current power into alternating-current power of adjustable frequency by the use of two cascaded electrostatically controlled valve converters, which comprises converting the direct-current power into alternating-current power of relatively high frequency in one of said converters, converting said high-frequency power into power of lower frequency in the other valve converter, and controlling the two valve converters at frequencies whose difference is adjustable.

9. An electric valve frequency changing system comprising an alternating current supply circuit, an alternating current load circuit of a frequency different from that of said supply circuit, a group of electric valves interconnecting each terminal of said load circuit with the several terminals of said supply circuit, and means for successively rendering said valves conductive to transmit energy from said supply circuit to said load circuit.

10. An electric valve frequency changing system comprising a polyphase alternating current supply circuit, a polyphase alternating current load circuit of a frequency different from that of said supply circuit, two groups of oppositely conductive electric valves interconnecting each phase of said load circuit with the several phases of said supply circuit, and means for successively rendering said valves conductive to transmit energy from said supply circuit to said load circuit.

11. Apparatus for transmitting energy between an input circuit and a polyphase alternating current circuit comprising a plurality of inductive windings for each phase of said polyphase circuit, an electric valve associated with each winding for interconnecting said circuits, means for coupling a winding of each of a plurality of said phases into a group, and means for rendering the valves associated with the windings of each group successively non-conductive for only a fraction of each cycle of alternating current equal to the reciprocal of the number of windings in the group, said coupling means forcing currents simultaneously through the remaining valves of each group.

12. Apparatus for transmitting energy between an input circuit and an $n$-phase polyphase alternating current circuit comprising a plurality of inductive windings for each phase of said polyphase circuit, an electric valve associated with each winding for interconnecting said circuits, means for coupling a winding of each phase into a group and for maintaining the sum of the voltages of the windings of each group equal to zero, and means for rendering each valve nonconductive for only $1/n$th of a cycle.

13. Apparatus for transmitting energy between an input circuit and an $n$-phase polyphase alternating current circuit comprising a pair of magnetically insulated inductive windings for each phase, an electric valve associated with each winding for interconnecting said circuits, means for coupling said windings into two groups, each group including a single winding of each phase, and means for rendering each valve nonconductive for only $1/n$th of a cycle.

14. Apparatus for transmitting energy between an input circuit and an $n$-phase polyphase alternating current circuit comprising $m$ inductive windings for each phase, an electric valve associated with each winding for interconnecting said circuits, means for coupling all of said windings so that the sum of their voltages is equal to zero, and means for rendering each valve nonconductive for only $1/mn$th of a cycle.

15. Apparatus for transmitting energy between an input circuit and a polyphase alternating current circuit comprising a plurality of inductive windings for each phase of said polyphase circuit, an electric valve associated with each winding for interconnecting said circuits, means for coupling a winding of each of a plurality of said phases into a group, means for rendering the valves associated with the windings of each group successively nonconductive for only a fraction of each cycle of alternating current equal to the reciprocal of the number of windings in the group, shunt admittance connected across one of said circuits to absorb differences in current between said circuits when said valves are open, and series impedance connected in the other circuit for absorbing differences in voltage between said circuits when said valves are closed.

16. The method of converting alternating-current power of one frequency into alternating-current power of another frequency by electrostatically controlled valves, which comprises varying the control electrode potentials of said valves at a frequency equal to the sum or difference of the first mentioned frequencies.

17. An electrical converter comprising a plurality of electrostatically controlled valves, an alternating-current input circuit, an alternating-current output circuit, and means controlling said valves successively and at a frequency equal to the sum or difference of the frequencies of said circuits, whereby electric power is changed in frequency.

18. Apparatus for converting direct current into low frequency alternating current comprising means including a plurality of electric valves for converting said direct current into high frequency alternating current, means including a plurality of other electric valves for converting said high frequency current into low frequency current, and means for controlling said last mentioned valves at a frequency equal to the sum or difference of said high and low frequencies.

19. The combination in a system of electrical distribution of a transformer having primary and secondary windings, a source of direct current, a pair of electron discharge valves for supplying current from said source to each primary winding of said transformer, said valves being so connected that during the operation thereof the potential of the cathode of one valve of each pair remains substantially fixed with respect to earth while the potential of the cathode of the second valve of each pair varies with respect to earth potential, and means for producing similar current variations through all of said valves.

20. An electric valve converting system comprising an inductive winding and a plurality of electric valves each provided with an anode, a cathode, and a control grid, the potentials of the cathodes of certain of said valves being fixed with respect to that of a point in said system and the potentials of the cathodes of other of said valves being variable with respect to that of said point during operation of the system, means for impressing upon all of said valves similar control potentials with respect to said point, and means for supplying to the grids associated with said last mentioned cathodes bias potentials substantially equal to the departure of said cathodes from the potential of said point.

21. A valve converter comprising a plurality of electrostatically controlled valves, a selector commutator and a reservoir condenser connected in circuit with the control electrodes of said valves, and means for operating said commutator for periodically and successively connecting the control electrodes of said valves to said condenser, whereby said control electrodes are rapidly changed in potential.

22. A valve converter comprising a plurality of electric valves each provided with a control element, an energy storage element, means for storing energy in said element, and means for periodically and successively connecting said control elements to said energy storage element for rapidly changing their potential.

23. A valve converter comprising a plurality of electric valves each provided with a control grid, a storage condenser, a charging circuit for said condenser, means for periodically and successively connecting said condenser to said control grids and subsequently connecting said condenser and said grids to said charging circuit.

24. In an electrostatically controlled valve converter having a plurality of valves, the control electrodes of which are arranged in at least two sets whose potentials change rapidly in opposite senses, the method of attaining simultaneous changes in potential in said sets which comprises charging said sets in series from a common source of voltage which is electrically isolated at the instant of charging.

In testimony whereof I affix my signature.

LOUIS A. HAZELTINE.